(12) United States Patent
Tew, Jr. et al.

(10) Patent No.: US 11,204,288 B2
(45) Date of Patent: Dec. 21, 2021

(54) TRIPLE POINT IMMERSION CELL ARTICLE

(71) Applicant: Government of the United States of America, as represented by the Secretary of Commerce, Gaithersburg, MD (US)

(72) Inventors: Weston Leo Tew, Jr., Clarksburg, MD (US); Jay Robert Nanninga, Monrovia, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 278 days.

(21) Appl. No.: 16/567,765

(22) Filed: Sep. 11, 2019

(65) Prior Publication Data
US 2021/0072098 A1 Mar. 11, 2021

(51) Int. Cl.
*G01K 1/08* (2021.01)
*G01K 13/00* (2021.01)
(Continued)

(52) U.S. Cl.
CPC ............ *G01K 13/006* (2013.01); *G01K 1/02* (2013.01); *G01K 1/08* (2013.01); *G01K 11/06* (2013.01);
(Continued)

(58) Field of Classification Search
CPC .......... G01K 13/006; G01K 1/02; G01K 1/08; G01K 11/06; G01K 2203/00;
(Continued)

(56) References Cited

U.S. PATENT DOCUMENTS 4,211,085 A * 7/1980 Tyree, Jr. .................. F17C 5/02
62/165
4,734,116 A * 3/1988 Ehrsam ..................... F25C 1/16
62/532

(Continued)

OTHER PUBLICATIONS

Furukawa, G.T., et al., "Triple Point of Argon", Temp. Meas. Contr. Sci. Indus., 1972, p. 231-243, vol. 4.
(Continued)

*Primary Examiner* — Gail Kaplan Verbitsky
(74) *Attorney, Agent, or Firm* — Office of Chief Counsel for National Institute of Standards and Technology

(57) ABSTRACT

A triple point immersion cell article determines a triple point of a non-metallic analyte and includes: a first cryochamber including a first cryo-zone; a second cryochamber including a second cryo-zone that is: nested and disposed in the first cryochamber; and thermally isolated by the first cryochamber; a third cryochamber including a third cryo-zone, the third cryochamber being: nested and disposed in the second cryochamber; thermally isolated from the exterior environment by the first cryochamber and the second cryochamber; and thermally isolated from the first cryochamber by the second cryochamber; and a fourth cryochamber including a fourth cryo-zone disposed in the third cryochamber; a triple-point pressure vessel disposed in the fourth cryochamber; and a thermowell disposed in the triple-point pressure vessel.

19 Claims, 25 Drawing Sheets

(51) Int. Cl.
*G01K 11/06* (2006.01)
*G01K 1/02* (2021.01)
*G01N 25/12* (2006.01)

(52) U.S. Cl.
CPC ......... *G01K 2203/00* (2013.01); *G01N 25/12* (2013.01)

(58) Field of Classification Search
CPC .... G01K 15/002; G01K 15/005; G01K 15/00; G01K 11/00; C02F 1/22; C02F 1/04; C02F 11/20; G01N 25/12; G01N 25/02; G01N 25/04
See application file for complete search history.

(56) References Cited

U.S. PATENT DOCUMENTS

| | | | | |
|---|---|---|---|---|
| 5,219,225 | A * | 6/1993 | Ball | G01K 15/002 374/1 |
| 6,293,695 | B1 * | 9/2001 | Schmermund | G01K 15/002 374/1 |
| 6,327,894 | B2 * | 12/2001 | Vaughn | G01L 5/28 303/86 |
| 6,939,035 | B2 * | 9/2005 | Machin | G01K 15/002 250/252.1 |
| 7,708,459 | B2 * | 5/2010 | Nakano | G01K 15/005 374/1 |
| 10,768,056 | B1 * | 9/2020 | Pond | G01K 15/002 |
| 2018/0224338 | A1 * | 8/2018 | Umkehrer | G01K 15/005 |
| 2019/0003648 | A1 * | 1/2019 | Kunberger | F17C 13/028 |
| 2019/0263699 | A1 * | 8/2019 | Finger | B01D 5/006 |
| 2019/0301784 | A1 * | 10/2019 | Sillince | F25D 3/107 |

OTHER PUBLICATIONS

Furukawa, G.T., et al., "Argon Triple Point Apparatus with Multiple Thermometer Wells", Temp. Meas. Cent. Sci. Indus., 1992, p. 265-269, vol. 6.

Ahmed, M.G., et al., "Argon Triple Point Device to Calibrate Long-Stem Thermometers in Quasi-Adiabatic Conditions", Temp. Meas. Contr. Sci. Indus., 2003, p. 172-202, vol. 7.

Yang, I., et al., "Development of the Sealed-Type Triple-Point-of-Argon Cell for Long-Stem SPRT Calibration at KRISS", Int. J Thermophys, 2008, p. 1740-1748.

Fluke calibration Inc., Model 5960A Triple Point of Argon System, http://download.flukecal.com/pub/literature/4226831b-fcal-5969-ds-w.pdf.

Ding, R., et al., "Experimental Study and Computer Modeling of the Triple Point of Argon System", NCSLI Measure, 2012, p. 58-62, vol. 7 No 1.

Pond Engineering, INc., Model K38, URL: www.pondengineering.com/s/k52_DataSheet_Jul2016.pdf, accessed Sep. 2018.

Pond Engineering, INc., Model K52, URL: www.pondengineering.com/s/k38_DataSheet_Mar2018-1.pdf, accessed Sep. 2018.

Pond, S.L., "Argon Triple Point Apparatus for SPRT Calibration", Temp. Meas. Contr. Sci. Indus., 2003, p. 203-208, vol. 7.

Isotech Ltd., "471 Simple Argon Triple Point Apparatus", URL: https://www.isotech.co.uk/news/new-argon-triple-point accessed Sep. 2018.

Pavese, F., "Century—Stable Accurate Cryogenic-Temperature Fixed Points:Problems Solved and Problems to be Solved", Temp. Meas. Cont. Sci. Indus., 2003, p. 167-172, vol. 7.

Pavese, F., et al., "Cryogenic Temperature Sealed Fixed Points: a New-Generation of Modular Cells at IMGC", Temp. Meas. Cont Sci. Indus., 2003, p. 173-178, vol. 7.

Hermier, Y., et al., "A New Generation of Multicells for Cryogenic Fixed Points at BNM/INM", Temp. Meas. Cont. Sci. Indus., 2003, p. 179-185, vol. 7.

Kolodziej, B., et al., "Argon Triple-Point Device for Calibration of SPRTs", International Journal of Thermophysics, 2015, p. 229-239, vol. 36.

Ancsin, J., et al., "Argon triple point realization cryostat for platinum resistance long stem thermometers", Review Science Instruments, 1976, p. 1519-1521, vol. 47.

Tavener, J., "Argon Triple Point", Isotech Seminar, 2018.

* cited by examiner

254

TRIPLE POINT IMMERSION CELL ARTICLE

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov.

BRIEF DESCRIPTION

Disclosed is a triple point immersion cell article for determining a triple point of a non-metallic analyte, the triple point immersion cell article comprising: a first cryochamber comprising a first cryo-zone; a second cryochamber comprising a second cryo-zone, the second cryochamber being: nested and disposed in the first cryochamber; and thermally isolated from an exterior environment of the triple point immersion cell article by the first cryochamber; a third cryochamber comprising a third cryo-zone, the third cryochamber being: nested and disposed in the second cryochamber; thermally isolated from the exterior environment by the first cryochamber and the second cryochamber; and thermally isolated from the first cryochamber by the second cryochamber; a fourth cryochamber comprising a fourth cryo-zone, the fourth cryochamber being: nested and disposed in the third cryochamber; thermally isolated from the exterior environment by the first cryochamber, the second cryochamber, and the third cryochamber; and thermally isolated from the second cryochamber by the third cryochamber; and a triple-point pressure vessel comprising a fifth cryo-zone, the triple-point pressure vessel being: nested and disposed in the fourth cryochamber; thermally isolated from the exterior environment by the first cryochamber, the second cryochamber, the third cryochamber, and the fourth cryochamber; and thermally isolated from the third cryochamber by the fourth cryochamber; and a thermowell disposed in the triple-point pressure vessel, the triple-point pressure vessel being directly accessible from the exterior environment via thermowell.

Disclosed is a process for determining a triple point of a non-metallic analyte with the triple point immersion cell article, the process comprising: evacuating a vacuum chamber in which the first cryochamber is disposed; cooling the first cryo-zone, the second cryo-zone, the third cryo-zone, and the fourth cryo-zone with a cryocooler; flowing the non-metallic analyte into the triple point cell interior volume to partially condense the non-metallic analyte; inserting an immersion cooler in the thermowell to complete condensation of the non-metallic analyte; initiating freezing of the non-metallic analyte; removing the immersion cooler; introducing a calibrated standard platinum resistance thermometer into the thermowell; flowing helium heat-exchange gas in the thermowell; adjusting a set point temperature of each of the first cryochamber, the second cryochamber, the third cryochamber, and the fourth cryochamber to a selected value for the non-metallic analyte; pulse heating of the triple point cell pressure vessel in energy increments; adjusting a set point of the fourth cryo-zone to an adiabatic condition; suspending pulse heating; removing the calibrated standard platinum resistance thermometer; disposing a test standard platinum resistance thermometer into thermowell; removing the test standard platinum resistance thermometer from the thermowell; re-disposing the calibrated standard platinum resistance thermometer in the thermowell; resuming pulse melting; completely melting the non-metallic analyte; reinserting the immersion cooler into the thermowell; and refreezing the non-metallic analyte to determine the triple point of the non-metallic analyte.

BRIEF DESCRIPTION OF THE DRAWINGS

The following description should not be considered limiting in any way. With reference to the accompanying drawings, like elements are numbered alike.

DETAILED DESCRIPTION

Figure 1:
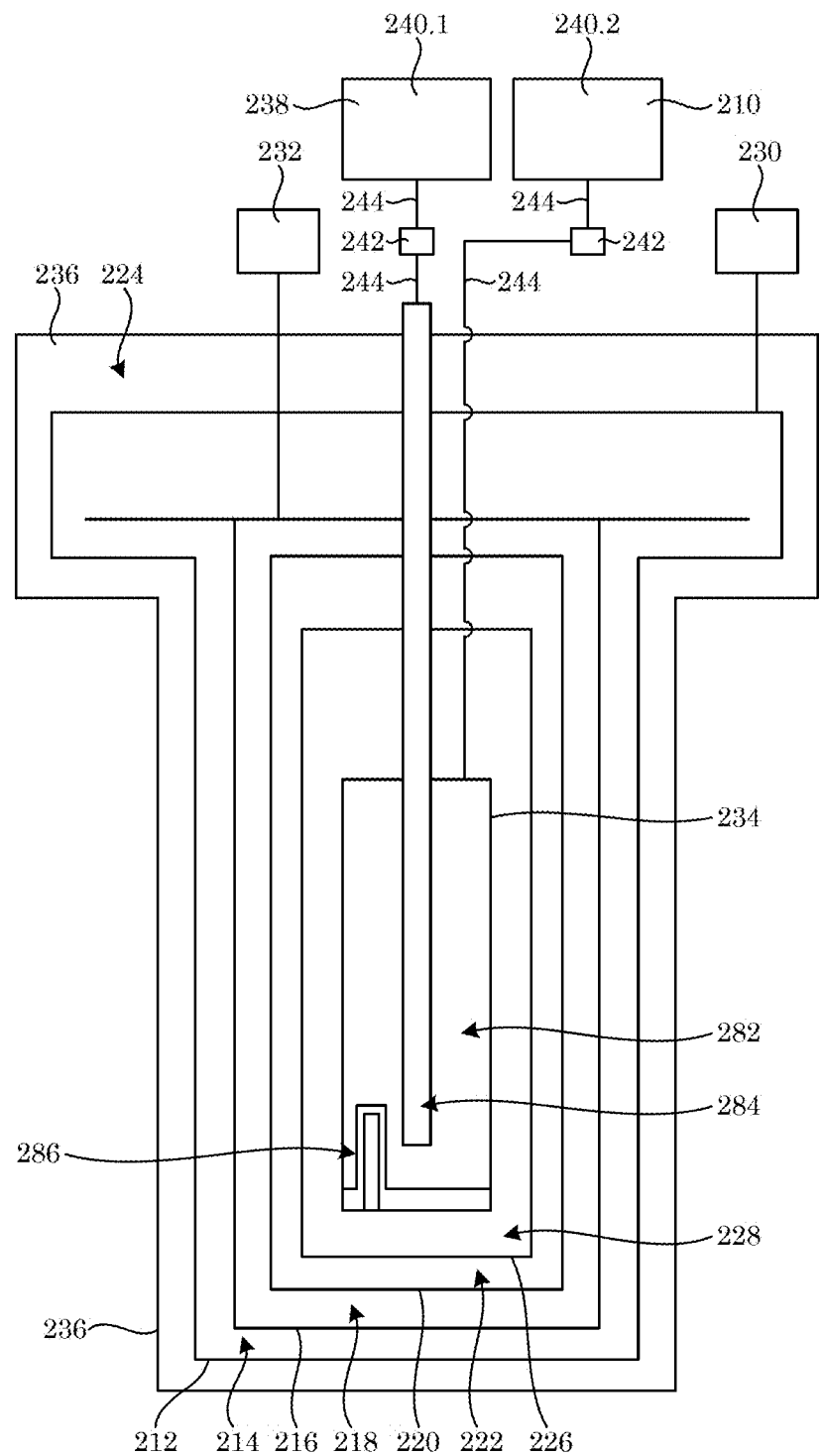
FIG. 1 shows a triple point immersion cell article.

A detailed description of one or more embodiments is presented herein by way of exemplification and not limitation.

It has been discovered that a triple point immersion cell article provides a realization of a triple point temperature with an uncertainty of less than or equal to 0.25 milliKelvin (mK) with a long-stem thermometer. Additionally, the triple point immersion cell article can provide the realization of triple point temperature of a non-metallic analyte such as a rare gas condensate. Moreover, triple point immersion cell article is operable at a steady-state cryogenic temperature in an absence of a liquid cryogen such as liquid nitrogen with an uncertainty factor from chemical impurities of less than 0.1 mK. Beneficially, the triple point immersion cell article has a thermowell with a length, e.g., an immersion depth, that minimizes an immersion effect error to less than 0.0.05 mK.

Triple point immersion cell article 200 provides a reproducible realization of the triple point temperature that is independent of the exterior environment. In an embodiment, with reference to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, and FIG. 22, triple point immersion cell article 200 includes first cryochamber 212 that having first cryo-zone 214 and second cryochamber 216 having second cryo-zone 218. Second cryochamber 216 is nested and disposed in first cryochamber 212 and is thermally isolated from exterior environment 224 of triple point immersion cell article 200 by first cryochamber 212. Third cryochamber 220 includes third cryo-zone 222, and third cryochamber 220 is nested and disposed in second cryochamber 216; thermally isolated from exterior environment 224 by first cryochamber 212 and second cryochamber 216; and thermally isolated from first cryochamber 212 by second cryochamber 216. Fourth cryochamber 226 includes fourth cryo-zone 228 and is nested and disposed in third cryochamber 220; thermally isolated from exterior environment 224 by first cryochamber 212, second cryochamber 216, and third cryochamber 220; thermally isolated from second cryochamber 216 by third cryochamber 220; and a triple-point pressure vessel, fifth and innermost cryo-zone, the triple-point pressure vessel being: nested and disposed in the fourth cryochamber; thermally isolated from the exterior environment by the first cryochamber, the second cryochamber, the third cryochamber, and the fourth cryochamber; thermally isolated from the third cryochamber by the fourth cryochamber; and directly accessible from the exterior environment via a thermowell.

In an embodiment, triple point immersion cell article 200 further includes first cryocooler 230 in thermal communication with first cryochamber 212. Second cryocooler 232 ca be disposed in thermal communication with second cryochamber 216. It is contemplated that first cryo-zone 214 and second cryo-zone 218 are subjected to closed-cycle refrigeration in an absence of a liquid cryogen.

Triple point immersion cell article 200 can include thermowell 284 in thermal communication with first cryo-zone 214, second cryo-zone 218, third cryo-zone 222, and fourth cryo-zone 228 and in mechanical communication with first cryochamber 212, second cryochamber 216, third cryochamber 220, and fourth cryochamber 226.

Vacuum chamber housing 236 is disposed around first cryochamber 212, second cryochamber 216, third cryochamber 220, fourth cryochamber 226, triple point cell pressure vessel 234, and thermowell 284. Gas tank 240.1 can be in fluid communication via gas line 244 with thermowell 284 to provide a heat-exchange gas to thermowell 284, and gas tank 240.2 can be in fluid communication via gas line 244 and triple-point cell pressure vessel 234 to provide a condensable portion of the non-metal analyte to triple point cell interior volume 282. It is contemplated that valves 242.1 and 242.2 can be interposed between portions of gas lines 244.1 and 244.2, respectively, to control flow of gases from gas tanks 240.1 and 240.2.

With reference to FIG. 1, FIG. 2, FIG. 3, FIG. 4, FIG. 5, FIG. 6, FIG. 7, FIG. 8, and FIG. 9, triple point immersion cell article 200 determines the triple point of non-metallic analyte 210 in which first cryocooler 230 and second cryocooler 232 are disposed on primary base flange 250.2 that is disposed on vacuum chamber nipple upper flange 250.3 of vacuum chamber housing 236.2. Primary base flange 250.2 is a top flange of vacuum chamber housing 236. First cryocooler 230 and second cryocooler 232 independently can include: vibration absorbing shock mounts 230.1, 232.1; vacuum bellows couplings 230.2, 232.2, to both isolate and dampen any vibrations generated by motors, compressors and related mechanisms; and thermal straps 230.3, 232.3 to further mechanically isolate the cryocoolers' thermal absorbers and while retaining good thermal coupling to the first cryochamber 212 and second cryochamber 216. Exemplary first cryocooler 230 and second cryocooler 232 include single-stage Stirling cycle cryocoolers, pulse-tube cryocoolers, Gifford-McMahon cycle cryocoolers, and the like. Moreover, the first cryocooler provides, e.g., at least 15 W of cooling power near 100 K and the second cryocooler provides, e.g., at least 5 W of cooling power near 80 K. First cryocooler 230 and second cryocooler 232 independently can provide continuous cooling at a temperature from 60 K down to 300 K or less than 60K. Moreover, the ultimate achievable base temperature for the second cryochamber can depends an available cooling power of the second cryocooler; or a cooling power and achievable base temperature of the first cryocooler as thermally coupled to the first cryochamber. In an embodiment, first cryocooler 230 and second cryocooler 232 include independent free-displacer-type single-stage Stirling-cycle cryocoolers.

A demountable service flange 250.1 also is disposed on a primary base flange 250.2 and is provisioned with vacuum feed-through ports 276 that provide assembly, disassembly, and service operations. Service flange 250.1 provides access ports for gas lines and electrical connections into the interior of the vacuum chamber housing 236. Vacuum feedthrough ports 276 can accommodate a multi-pin vacuum feedthrough unit.

First gas line 268 is received by and fed through service flange 250.1. First gas line 268 receives the non-metal gas analyte and communicates the gas analyte from gas tanks 240 into the triple point cell interior volume 282. Gas line pressure can be from vacuum to 20 bar. Moreover, first gas line 268 provides flow of gas analyte into or out of the triple point cell interior volume 282 or, under static conditions, equilibrates with condensed phase portions to saturated vapor pressures or otherwise according to known equation of state conditions. In an embodiment, gas analyte includes high purity argon, krypton, or xenon in solid, liquid, vapor or supercritical gas phases.

Second gas line 270 is received by and fed through service flange 250.1. Second gas line 270 receives helium gas and communicates helium into thermowell 284 via heat-exchange flange 250.13. The pressure of helium gas can be from vacuum to 1.3 bar, specifically a continuous flow of 100 cm$^3$/min helium may be maintained at an approximate regulated inlet pressure of 1.1 bar when discharged to 1.0 bar ambient pressure. Moreover, the helium gas temperature can approximately equilibrate with the temperature of the heat-exchange flange 250.13 and convey a continuous cooling to the interior of the thermowell 284. In an embodiment, the helium gas provides additional distributed cooling to the thermowell 284 and to any thermometers which are placed therein.

Third gas line 272 is received by and fed through service flange 250.1. Third gas line 272 communicates the non-metal gas analyte and gas analyte from gas tanks 240 into the triple point cell interior volume 282 and is in parallel and redundant with that of first gas line 268. In an embodiment, a third gas line is functionally and operationally equivalent to the first gas line 268 and provides redundancy to enhance safety and reliability to the immersion cell article.

Non-metallic analyte 210 is received by first gas line 268 or third gas line 272 and communicated to or from triple point cell interior volume 282. Non-metallic analyte 210 can include a noble gas or fluorocarbon having a triple point temperature from 80 K to 200 K. Exemplary non-metallic analyte 210 includes high purity argon. As used herein, the triple point of pure argon is 83.8058 K with a saturated vapor pressure of 0.69 bar. A pressure of non-metallic analyte 210 can be from vacuum to 20 bar when volumes have reached 300 K temperature and all pressurized volumes are designed to specifications well above the nominal 20 bar limit. Moreover, non-metallic analyte 210 can be in a sub-critical or a supercritical state at 300 K and provide final state pressures are 20 bar or less. Gas tanks 240 are protected with independent burst disks for pressurization. In addition, triple point cell pressure vessel 234 includes burst disc 264 set to within 10% of its test pressure value of 120 bar, which is six times a storage pressure of 20 bar at 300 K. In an embodiment, non-metallic analyte 210 includes noble gasses or stable inert fluorocarbons with chemical purities of at least 0.999995% and having triple point temperatures from 83 K to 170 K.

Flanges, chambers, and other hardware can be interconnected by permanent fixturing or metal joinery such as a weld, braze, solder, and the like. In certain embodiment, flanges, chambers, and other hardware are de-mountable and can be interconnected and attached to one another via a fastener such as clamp 252, a bolt, screw, compression, and the like. Flanges can have sealing surface that include provision (e.g., a gland and the like) for receipt of a gasket (a metal, elastomer, or the like), O-ring, and the like. As used herein, "de-mountable" refers to components that are readily disassembled and reassembled using fasteners. In an embodiment of triple point immersion cell article 200, first cryochamber 212, second cryochamber 216, third cryochamber 220, fourth cryochamber 226, and triple-point cell pressure vessel 234 are reversibly demountable and re-mountable from one another.

Flanges, chambers, and other structural hardware can include welded stainless-steel cylinders, stainless steel plates, welded aluminum cylindrical shells, aluminum plates, braised and or welded copper cylindrical shells, and copper plates to contain gas or sustain vacuum and to conduct heat and can be components to the vacuum chamber, cryochambers, or pressure vessel. Exemplary flanges, chambers, and other structural hardware are formed from standardized demountable vacuum flanges defined under ISO specifications. Moreover, the thermal and structural design of the overall article 200. Flanges, chambers, and other structural hardware can maintain a pressure from vacuum to 1.1 bar, specifically from $10^{-7}$ mbar to $10^{-6}$ mbar under 300 K conditions, and more specifically to pressures below $10^{-7}$ mbar when interior regions of the vacuum chamber have been cooled to their final base temperatures. Flanges, chambers, and other structural hardware can sustain temperatures from below 60 K up to at least 373 K, without damage or other adverse effects. Moreover, weld joints, braze joints, and demountable joints can accommodate stresses induced by differential thermal expansions over the full range of normal temperature excursions.

Vacuum chamber housing 236 can include cylindrical shells to form the main body and tail sections and can be rolled aluminum or stainless-steel tubes. Exemplary vacuum chamber housing 236 include rolled seamed aluminum tubing. Moreover, welded aluminum and stainless-steel tubing are easily joined to ISO flanges of like material for vacuum tight joints. Vacuum chamber housing 236 can provide modular sections to facilitate assembly/disassembly and convenient access to all internal chambers. In an embodiment, vacuum chamber housing 236 can be monolithic or multi-component. In an embodiment, vacuum chamber housing 236 includes one primary section 236.2 from rolled-aluminum welded-seam tubing and one tail section 236.1 of rolled stainless steel welded-seam tubing, and is coupled together via vacuum chamber lower base flange 250.5, vacuum chamber nipple lower flange 250.4 coupled to vacuum chamber housing tail section flange 250.7, and vacuum chamber nipple upper flange 250.3 with vacuum chamber primary base flange 250.2 coupled to vacuum chamber nipple upper flange 250.3, and vacuum chamber service flange 250.1 and vacuum port (pump-out) flange 250.6 as shown in in FIG. 2, FIG. 3, FIG. 4, FIG. 5, FIG. 6, FIG. 7, FIG. 8, FIG. 9, FIG. 10, and FIG. 11.

First cryochamber 212 can include a metal shell assembly to approximate an isothermal boundary that is strongly thermally coupled to the absorber of the first cryocooler and weakly thermally coupled to the external environment. Exemplary first cryochamber 212 include all-welded aluminum or brazed copper shells with control sensors. Moreover, the first cryochamber assembly facilitates mechanical support of itself and all other internal chambers via a set of threaded fiberglass spacers 278. Specifically, certain supports 278.2 are adjustable to compensate for small misalignments that may occur between the geometric axes of other internal cryochambers. First cryochamber 212 can provide thermal isolation from ambient heat sources to other internal cryochambers, specifically isolation of the heat from the external environment to the second, third, and fourth cryochambers 216, 220, and 226, and more specifically to the triple-point cell pressure vessel 234. In an embodiment, first cryochamber 212 can be monolithic or multi-component. In an embodiment, first cryochamber 212 is multi-component and includes welded aluminum cylindrical shells 212.1 and 212.2, flanges 250.9, 250.10 and 250.16, and demountable aluminum plates 250.8, 250.11 and 250.12. as shown in in FIG. 3, FIG. 4, FIG. 5, FIG. 6, FIG. 10, FIG. 11, FIG. 12, FIG. 13, FIG. 14, and FIG. 15.

Second cryochamber 216 can include a metal plate and shell assembly to approximate an isothermal boundary that is strongly thermally coupled to the absorber of the second cryocooler and weakly thermally coupled to the first cryochamber. Exemplary second cryochamber 216 include aluminum plates and welded aluminum cylindrical shells with control sensors. Moreover, the second cryochamber assembly facilitates mechanical support of and alignment of itself via a set of adjustable turnbuckle support bushings 278.2. Second cryochamber 216 can provide thermal isolation from stray heat sources to all other internal cryochambers, specifically isolation of the heat from the first cryochamber to the third, and fourth cryochambers 220, and 226, and more specifically to the triple-point cell pressure vessel 234. The second cryochamber 216 also cools the incoming helium heat exchange gas via the heat exchange flange 250.13 before it enters the thermowell 234. Moreover, the achievable base temperature for the second cryochamber determines the coldest point the entire triple point immersion cell article 200, the coldest point along the axis of the thermowell 284 and in turn the available cooling power to the third and fourth cryochambers 220, and 226. Moreover, the second cryochamber 216 establishes an isothermal cryo-zone 218 that is controlled at a set point approximately 1 K below the triple point temperature of the non-metal analyte. In an embodiment, second cryochamber 216 includes aluminum and copper plates and welded aluminum cylindrical shells. In an embodiment, second cryochamber 216 can be monolithic or multi-component. In an embodiment, second cryochamber 216 is multi-component and includes base plate 250.32 coupled to second cryochamber ring flange 250.16 as welded to the tail section cylindrical shield, and heat exchange flange 250.13 as shown in in FIG. 3, FIG. 4, FIG. 5, FIG. 6, FIG. 12, FIG. 13, FIG. 14, FIG. 15, FIG. 16, and FIG. 17.

Third cryochamber 220 can include a thin metal shell, sensors and heaters. Exemplary third cryochamber 220 include aluminum or copper demountable cylindrical shells. Moreover, the third cryochamber is weakly thermally coupled to the second cryochamber 216 and mechanically supported via the thermowell 284. Third cryochamber 220 is passively cooled and actively controlled such that it can provide moderate isolation from temperature variations in the second cryochamber 216 and some thermal isolation to the fourth cryochamber 226, and more specifically to the triple-point cell pressure vessel 234. Moreover, the third cryochamber 220 establishes an isothermal cryo-zone 222 that is controlled at a set point approximately 0.1 K below the triple point temperature of the non-metal analyte with a short-term stability of approximately ±20 mK. In an embodiment, third cryochamber 220 includes copper plates and welded copper cylindrical shells, heaters and platinum resistance thermometers. In an embodiment, third cryochamber 220 can be monolithic or multi-component. In an embodiment, third cryochamber 220 is multicomponent and includes upper plate 250.14 coupled to ring third cryochamber ring flange 250.15 as shown in in FIG. 5, FIG. 6, and FIG. 18.

Fourth cryochamber 226 can include a thin metal shell, sensors and heaters. Exemplary fourth cryochamber 226 include aluminum or copper demountable cylindrical shells. Moreover, the fourth cryochamber 226 is moderately thermally coupled to the third cryochamber 220 and mechanically supported via the thermowell 284. Fourth cryochamber 226 is passively cooled and actively controlled such that it can provide moderate isolation from temperature variations in the third cryochamber 220 and a high degree of thermal isolation to the triple-point cell pressure vessel 234. It is contemplated that fourth cryo-zone 228 establishes near-adiabatic conditions for the triple-point cell pressure vessel 234 with heat leaks of approximately 10 microwatts or less. Moreover, the adiabatic cryo-zone 228 is controlled at a set point approximately ±1 mK from the triple point temperature of the non-metal analyte with a short-term stability of approximately ±1 mK and such conditions are necessary to provide a stable and reproducible melt plateau for non-metallic analyte 210. In an embodiment, fourth cryochamber 226 includes copper plates and welded copper cylindrical shells, heaters and platinum resistance thermometers. In an embodiment, fourth cryochamber 226 can be monolithic or multi-component. In an embodiment, fourth cryochamber 226 is multi-component and includes upper plate 250.50 coupled to ring flange 250.52 as shown in in FIG. 5, FIG. 6, and FIG. 19.

The triple-point cell pressure vessel 234 encloses the triple-point cell interior volume 282 and receives a long-stem thermometer via the thermowell 284 for calibration at the triple point of non-metallic analyte 210. The pressure vessel 234 is joined to the thermowell 284 via the vapor chamber lid 262. The lower section of the pressure vessel 234 is terminated with an internal equilibration block 286. Both the thermowell and the internal equilibration block 286 serve to equilibrate thermometers with the non-metallic analyte 210. In an embodiment, triple-point cell pressure vessel 234 is made from all-welded stainless-steel sections that includes vapor chamber lid 262 with burst disc 264 and internal equilibration block 286 disposed thereon as shown in in FIG. 5, FIG. 6, FIG. 20, FIG. 21, and FIG. 22.

The long-stem thermometer can include any of several varieties of quartz or metal-sheathed types of length 48 cm or greater and outer diameters between 6.35 mm and 7.5 mm. Exemplary long-stem thermometers include a 25.5-ohm standard platinum resistance thermometer (SPRT). Moreover, such SPRTs equilibrate with the non-metal analyte via the thermowell fin tube 284.1 and are used to both evaluate the melting plateau of the non-metal analyte and facilitate comparison of the plateau temperatures with that of other triple-point temperature standards.

The capsule-type thermometer can include any or several varieties of glass or platinum-sheathed types with internal helium atmospheres. Exemplary capsule-type thermometers include capsule-type 25.5 Ohm Standard Platinum Resistance Thermometers (SPRTs). Moreover, such SPRTs equilibrate with the non-metal analyte via the internal equilibration block 286 and are used to establish the melt-to-melt reproducibility of the non-metallic analyte's triple point temperature.

Thermowell 284 can include certain sections or segments to facilitate insertion and removal of long-stem SPRTs into and out of the triple-point cell pressure vessel 234 and thermally couple to the non-metallic analyte 210. Exemplary thermowells 284 include various metal tubing as joined to the body of the triple-point cell pressure vessel 234 and are thermally coupled the non-metallic analyte 210 over regions of the triple-point cell interior volume 282. Moreover, thermowell 284 is thermally coupled to the non-metallic analyte 210 over a vertical region of the triple point cell interior volume 282 in excess of 15 cm known as the immersion depth. Moreover, thermowell 284 can provide thermal coupling to non-metallic analyte 210 via thin copper fins that extend radially into sections of triple-point cell interior volume 282. In an embodiment, thermowell 284 can be monolithic or multi-component. In an embodiment, thermowell 284 is multi-component and includes: a lower-most section of stainless steel tubing 284.1 with copper heat-exchange fins 284.5; an intermediate section of stainless steel tubing 284.2 to facilitate thermometer guidance and mechanical support of inner cryo-zones; an upper section of stainless steel tubing 284.3 that extends to vertical dimension of the thermowell; and gas-seal fitting 284.4 for making gas-tight connections to long-stem thermometer sheaths. In an embodiment, thermowell 284 is in thermal communication with first cryo-zone 214, second cryo-zone 218, third cryo-zone 222, and fourth cryo-zone 228 and is in mechanical communication supported via second cryochamber heat exchange flange 250.13. In an embodiment, thermowell 284 receives helium as a heat exchange gas 238 at a pressure from 1 bar to 1.1 bar, and more specifically is sealed to heat exchange flange 250.13 using crushed-indium-wire seals at the uppermost section of thermowell guide tube 284.2 and the lowermost section of thermowell extension tube 284.3.

Thermowell fin tube 284.1 can include a section of metal tubing with similar or dissimilar metal fins to extend the effective surface area of the tube's exterior. Moreover, the heat-exchange surfaces must extend into regions of the triple-point cell interior volume 282 containing at least one condensed phase of the non-metallic analyte. Thermowell fin tube 284.1 can achieve thermal equilibration between itself and one or both condensed phases of the non-metallic analyte 210. In an embodiment, thermowell fin tube 284.1 includes a helical strip of copper heat-exchange fins 284.5 that is brazed onto its exterior surface.

First cryochamber 212, second cryochamber 216, third cryochamber 220, fourth cryochamber 226, respectively provide first cryo-zone 214, second cryo-zone 218, third cryo-zone 222, fourth cryo-zone 228. As used herein, cryo-zone refers to regions of the interior volume which will equilibrate to temperatures near that of the associated cryochamber surfaces. Moreover, the four cryo-zones are weakly thermally coupled to each other. The fourth cryo-zone approximates an adiabatic zone as far as heat exchange between the fourth cryochamber and triple-point cell pressure vessel is concerned. As used herein, adiabatic zone refers to conditions where heat transported between bodies is 10 microWatts or less. Moreover, the adiabatic zone is accomplished via balancing a small residual cooling power with a small applied heating power using a combination of differential thermocouples and high-accuracy SPRTs located in fourth cryochamber 226 and internal equilibration block 286. Fourth cryo-zone 228 is an adiabatic zone with respect to a triple point transition temperature of non-metallic analyte 210.

Figure 24:
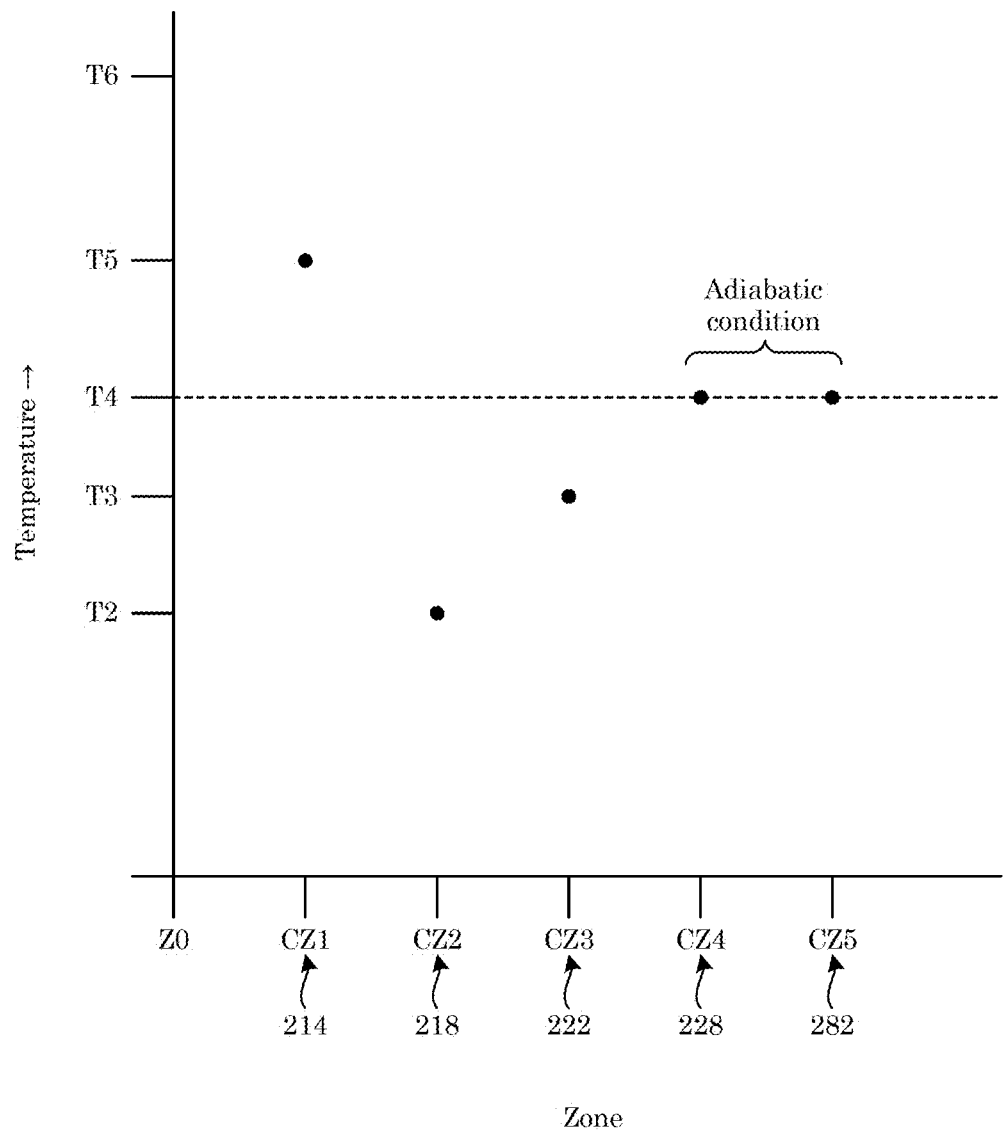
FIG. 24 shows a graph of temperature versus zone for a triple point immersion cell article.

Triple point immersion cell article 200 includes cryozones that are generated by active cooling. Under active cooling, heat is removed over the entire cryochamber by thermally coupling all segments to a heat absorbing surface. It is contemplated that first cryo-zone 214 and second cryo-zone 218 are subjected to closed-cycle refrigeration in an absence of a liquid cryogen. As used herein, "cryogen" refers to a substance that may be readily condensed into a liquid phase at moderate or low saturated pressure. As used herein, "liquid cryogen" refers to a bulk condensed material undergoing open-cycle pool boiling in saturated vapor conditions. In contrast, as used herein, "closed-cycle refrigeration" refers to machines operating in continuous thermodynamic cycles with a fixed amount of gas-phase helium. In this regard, first cryocooler 230 actively cools first cryochamber 212 to produce first cryo-zone 214, and second cryocooler 232 actively cools second cryochamber 216 to produce second cryo-zone 218. It is contemplated that third cryo-zone 222 is passively cooled, wherein ordinary conduction through the thermowell guide tube 284.2 can provide approximately 22 mW/K over a 1 cm length at 80 K. Third cryo-zone 222 is subjected to active thermal control to a constant temperature, wherein the constant temperature set point is approximately (0.1±0.02) K below the triple point temperature of the non-metal analyte. It is contemplated that fourth cryo-zone 228 is passively cooled via third cryo-zone 222, wherein ordinary conduction through the thermowell guide tube 284.2 can provide approximately 22 mW/K over a 1 cm length at 80 K. Fourth cryo-zone 228 is adiabatic with respect to the triple-point cell pressure vessel 234 and internal equilibration block 286. It should be appreciated that third cryo-zone 222 temperature is maintained approximately 0.1 K below that of fourth cryo-zone 228 as a consequence of the adiabatic conditions maintained between the triple point cell pressure vessel 234 and the fourth cryochamber 226 as shown in FIG. 24. Referring to FIG. 24, T3=T4−0.1 K; T2=T3−1.0 K; and T5=T2+20 K, allowing for margins of error between 10% and 20% of the stated temperature differences.

In an embodiment, a pressure of first cryochamber 212, second cryochamber 216, third cryochamber 220, and fourth cryochamber 226 is high-vacuum, specifically less than 1 microbar when all cryochambers are below 200 K. In an embodiment, first cryo-zone 214, second cryo-zone 218, third cryo-zone 222, and fourth cryo-zone 228 are subjected to active control of their respective temperature.

Figure 11:
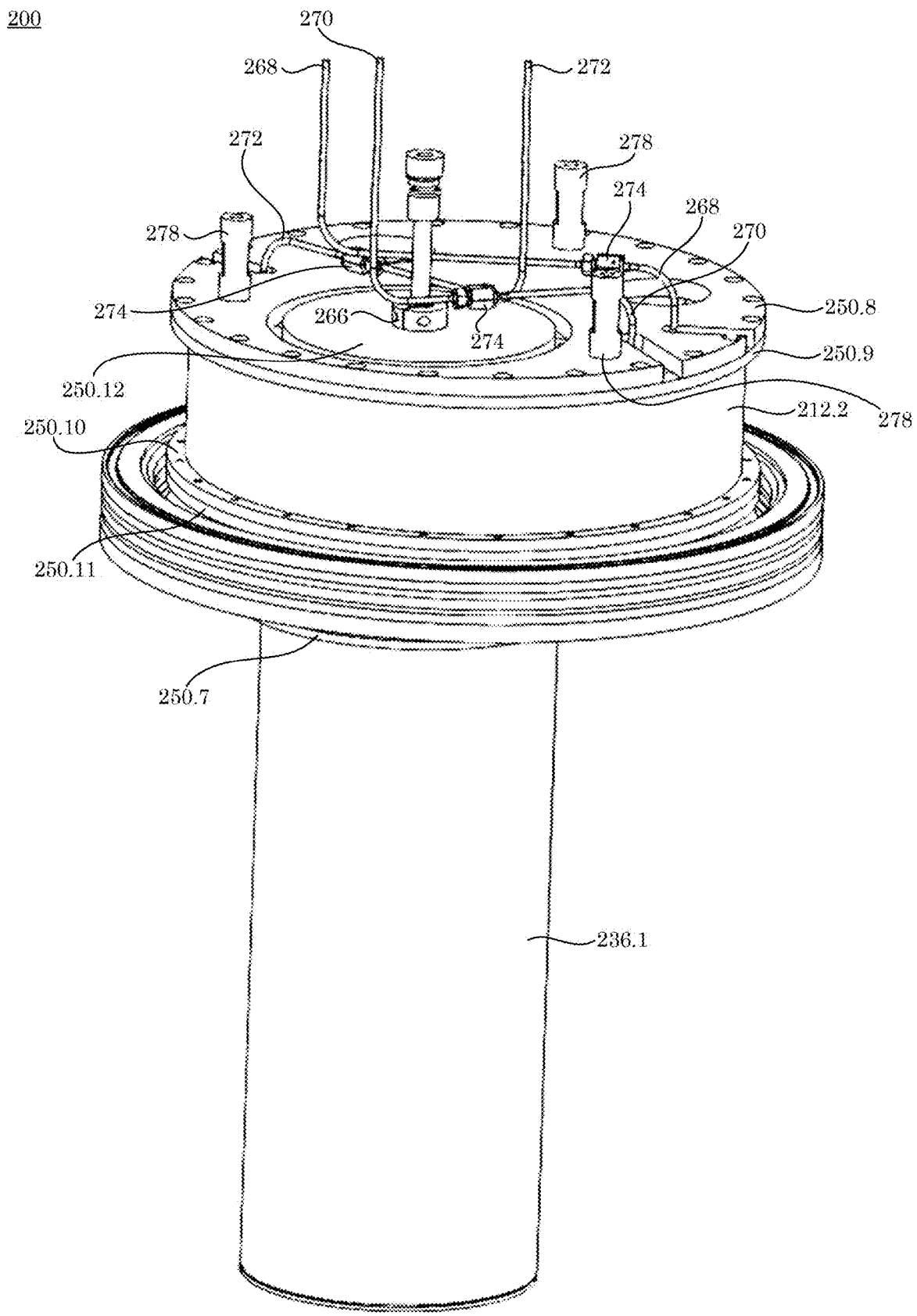
FIG. 11 shows a perspective view of the triple point immersion cell article shown in FIG. 2 with vacuum chamber housing viewable.
Figure 12:
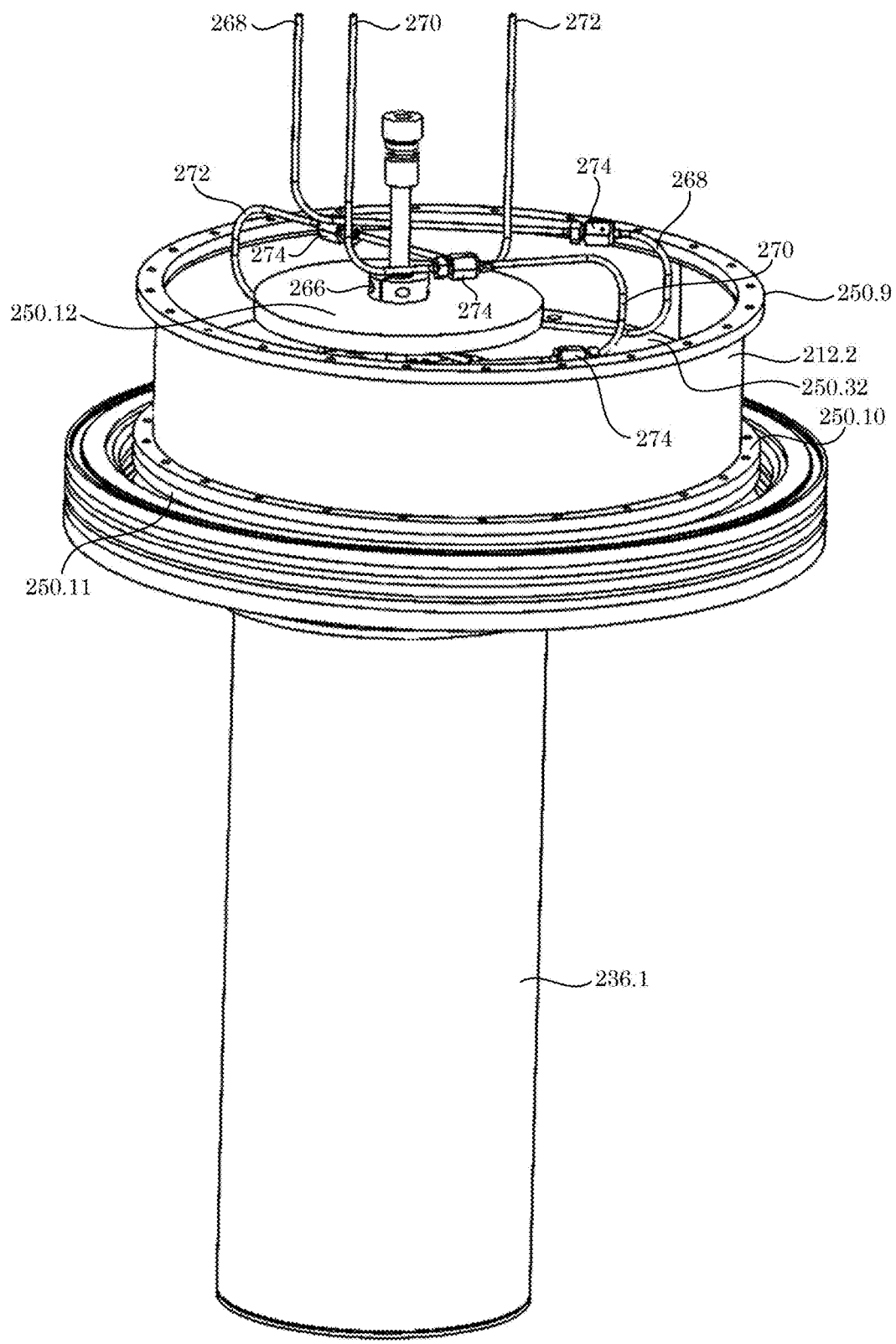
FIG. 12 shows a perspective view of the triple point immersion cell article shown in FIG. 2 with vacuum chamber housing viewable.
Figure 13:
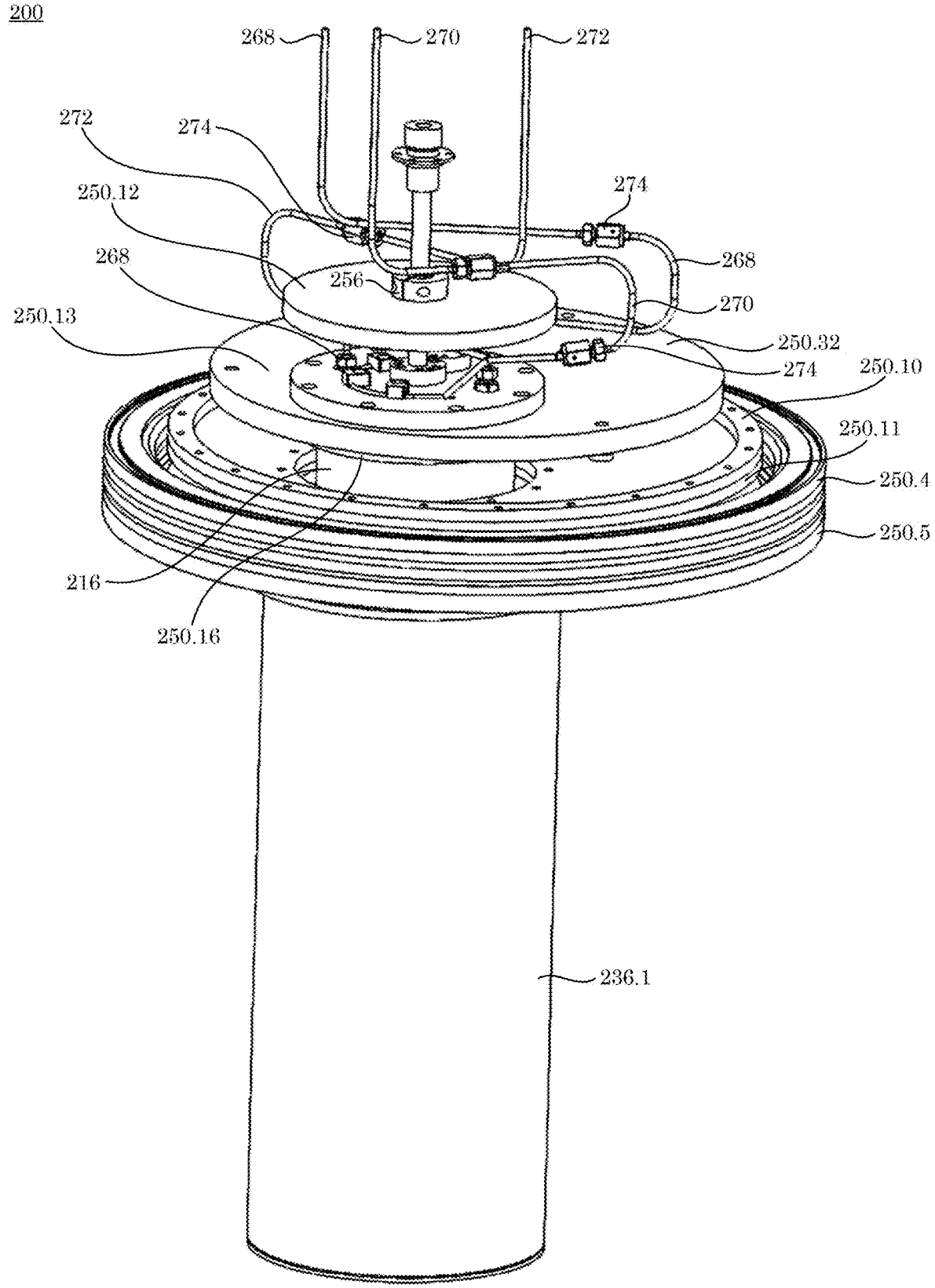
FIG. 13 shows a perspective view of the triple point immersion cell article shown in FIG. 2 with vacuum chamber housing viewable.
Figure 14:
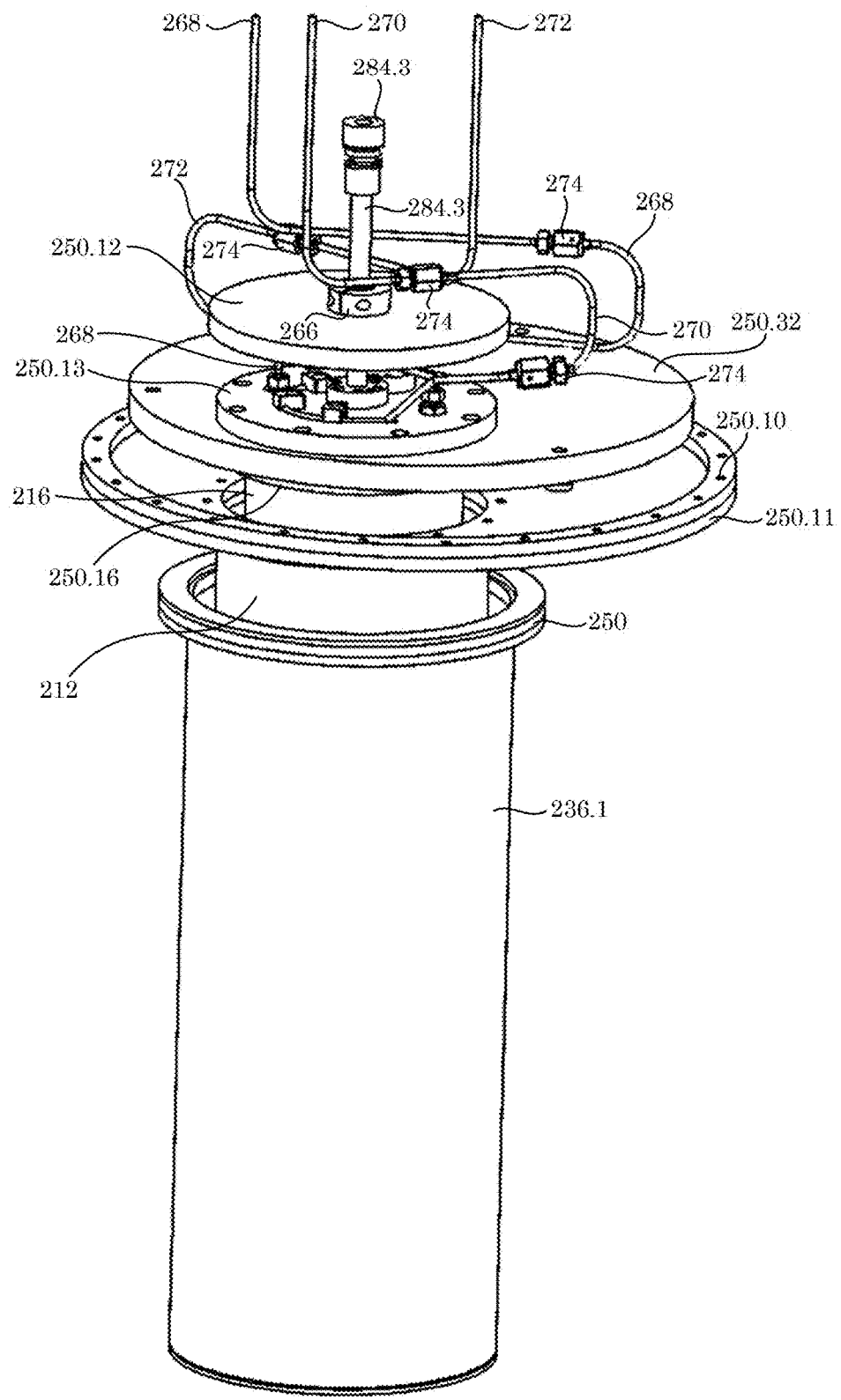
FIG. 14 shows a perspective view of the triple point immersion cell article shown in FIG. 2 with vacuum chamber housing viewable.
Figure 15:
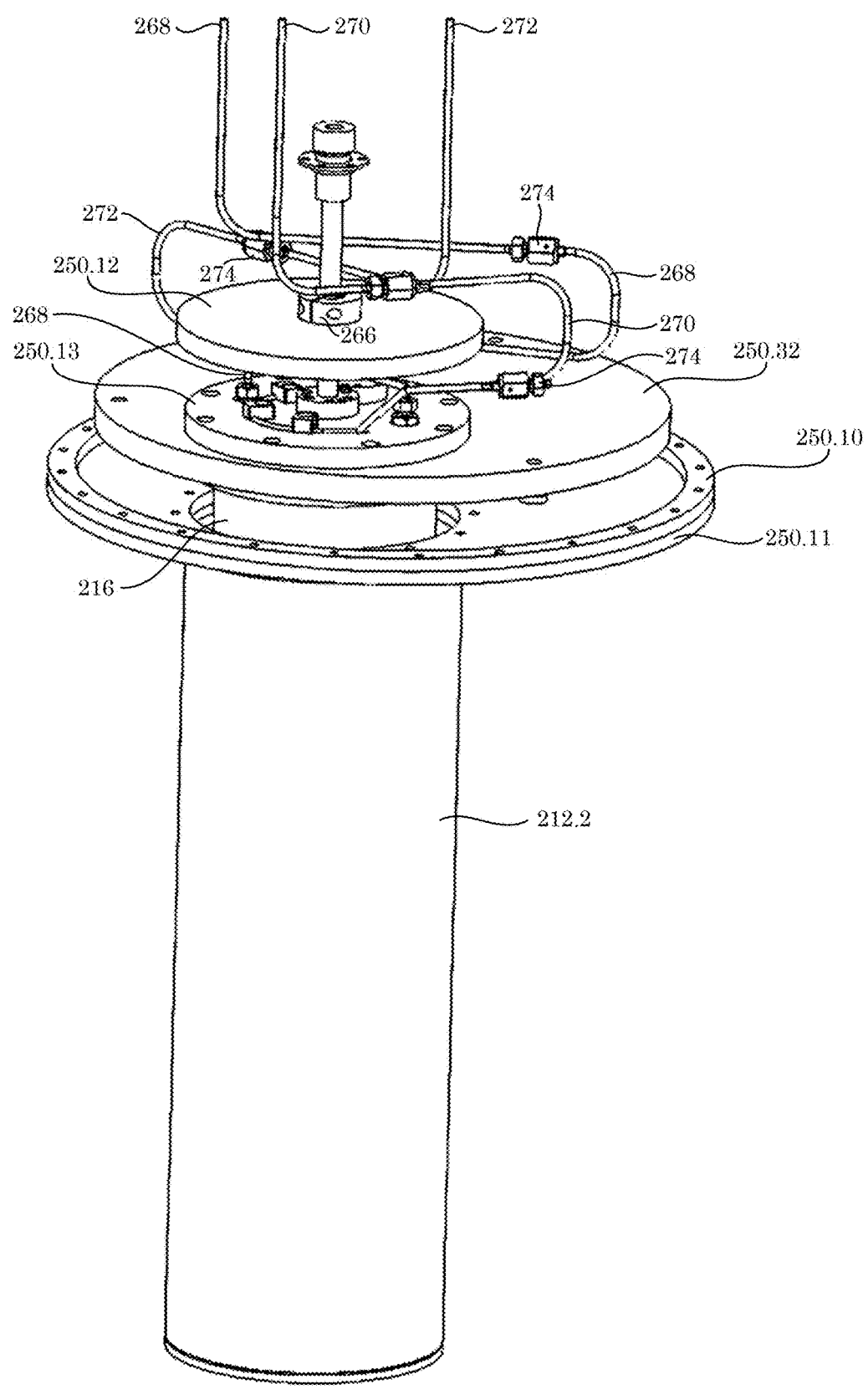
FIG. 15 shows a perspective view of the triple point immersion cell article shown in FIG. 2 with a first cryochamber viewable.
Figure 16:
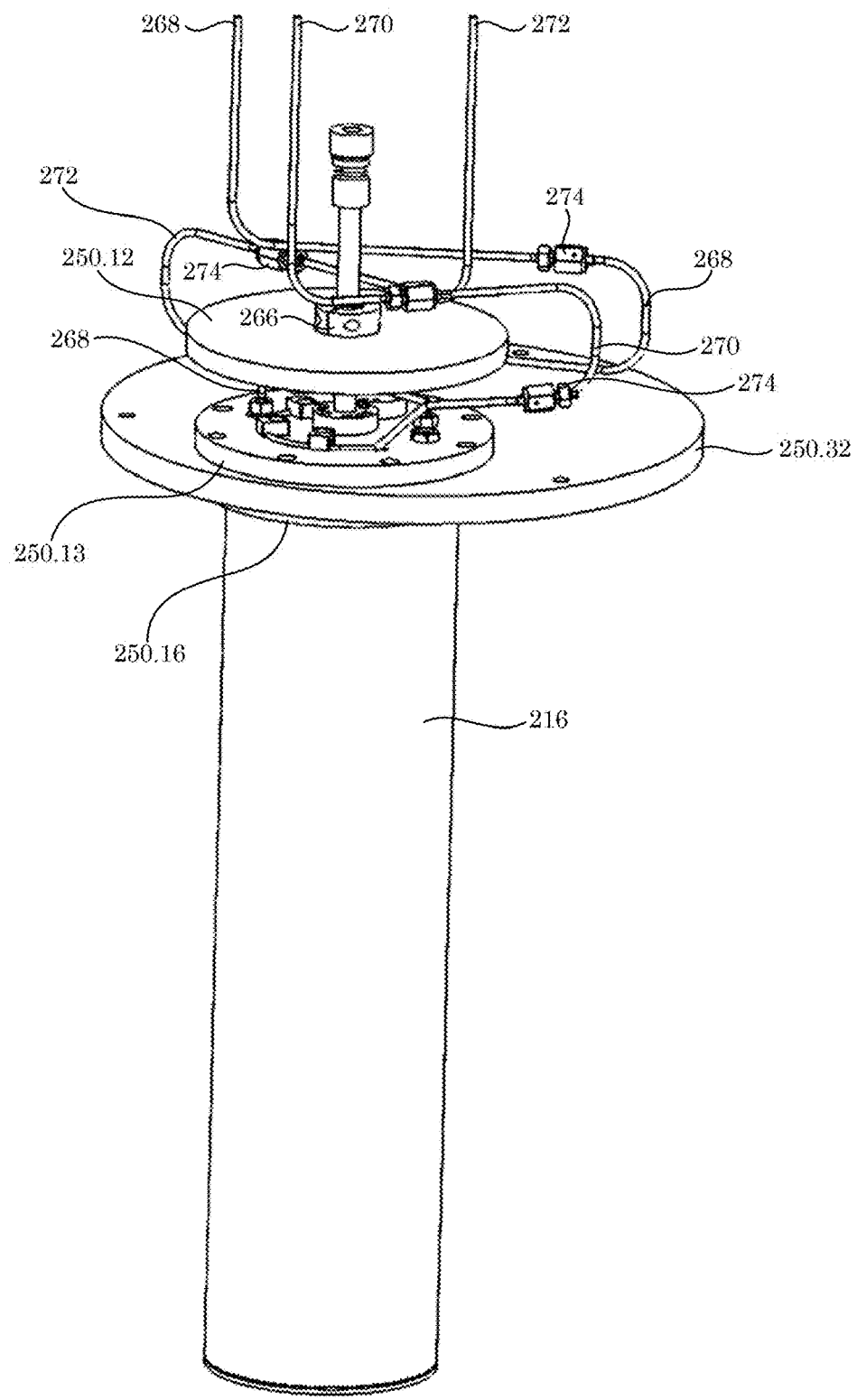
FIG. 16 shows a perspective view of the triple point immersion cell article shown in FIG. 2 with a second cryochamber viewable.
Figure 17:
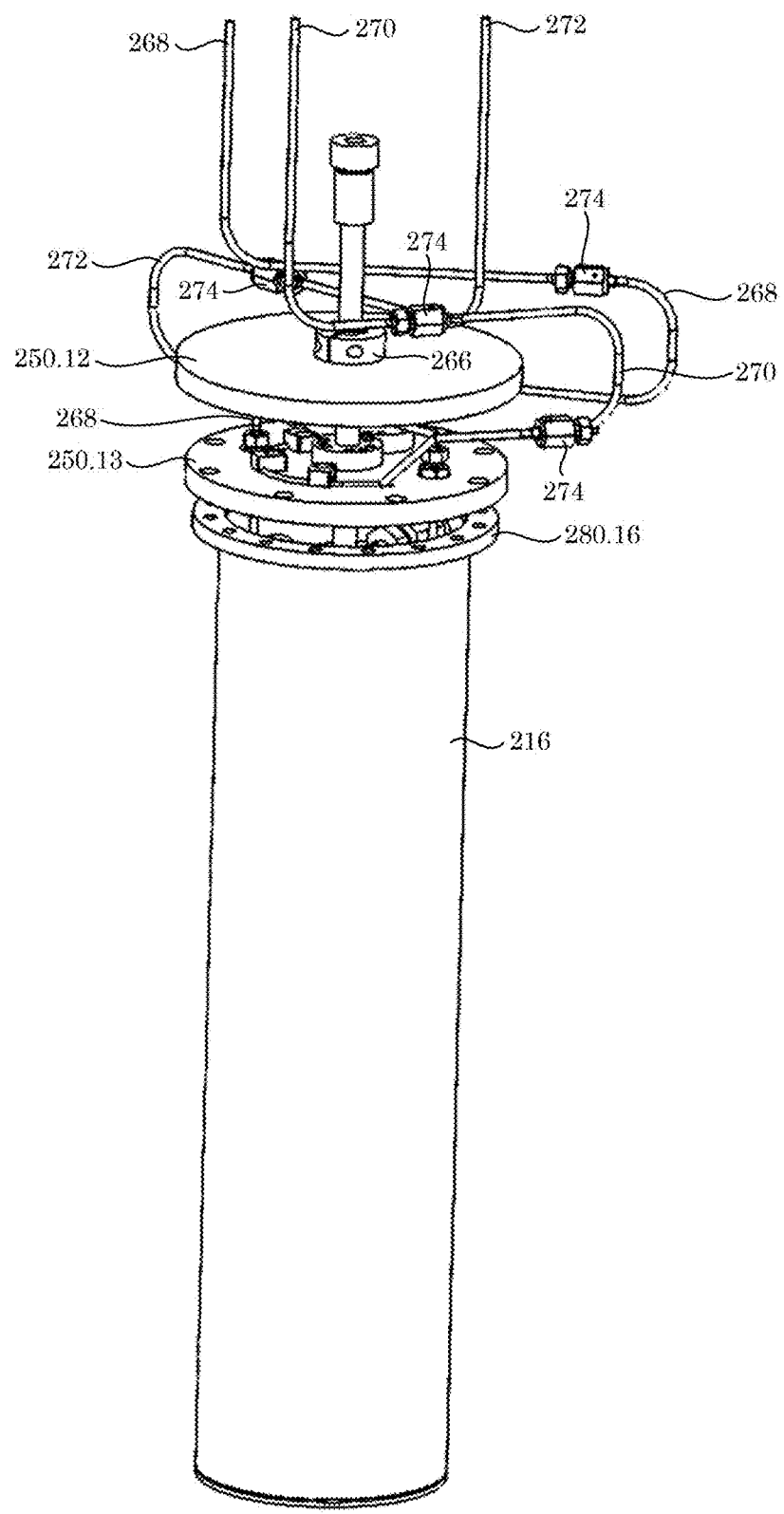
FIG. 17 shows a perspective view of the triple point immersion cell article shown in FIG. 2 with a second cryochamber viewable.
Figure 18:
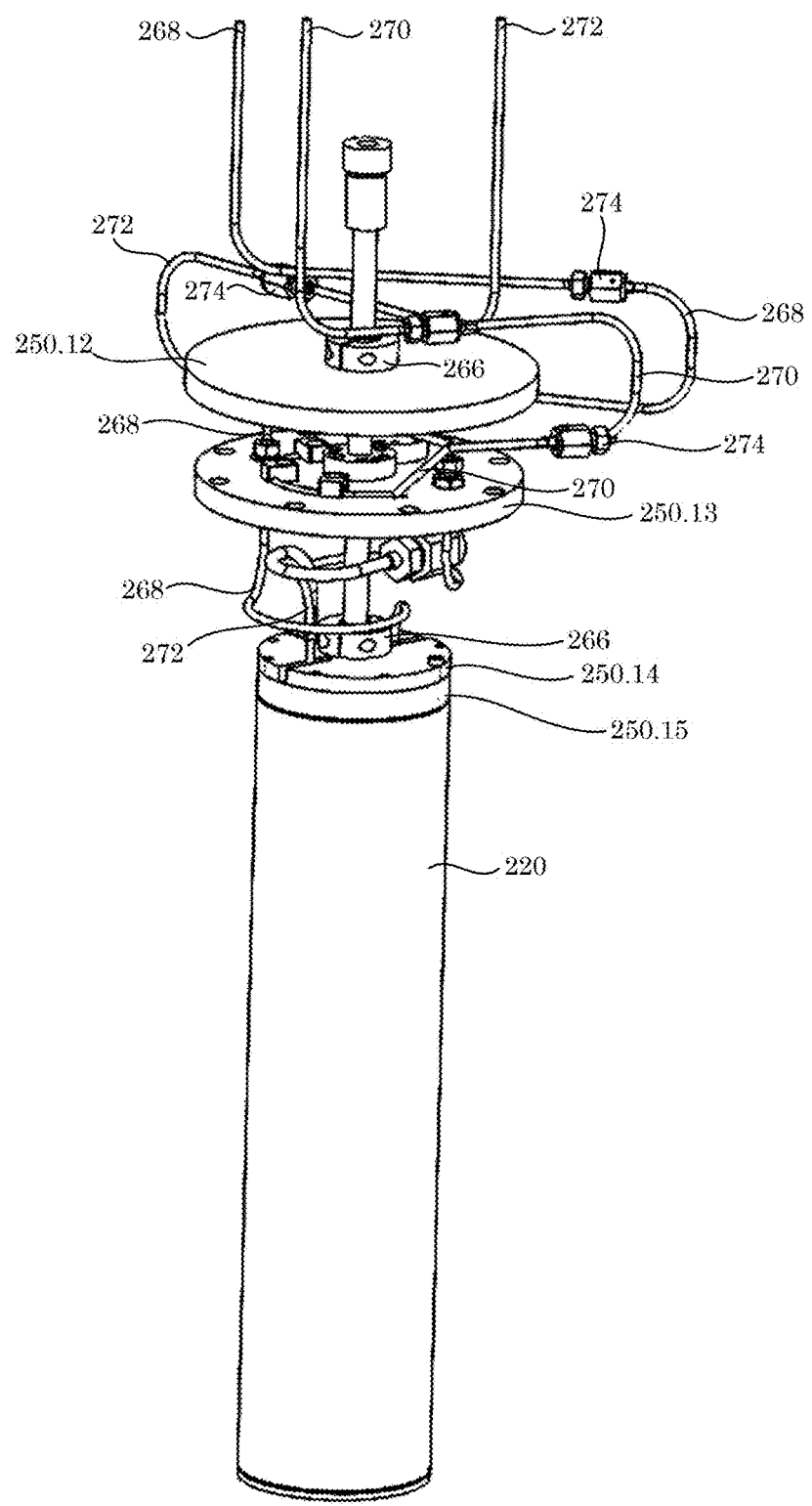
FIG. 18 shows a perspective view of the triple point immersion cell article shown in FIG. 2 with a third cryochamber viewable.
Figure 19:
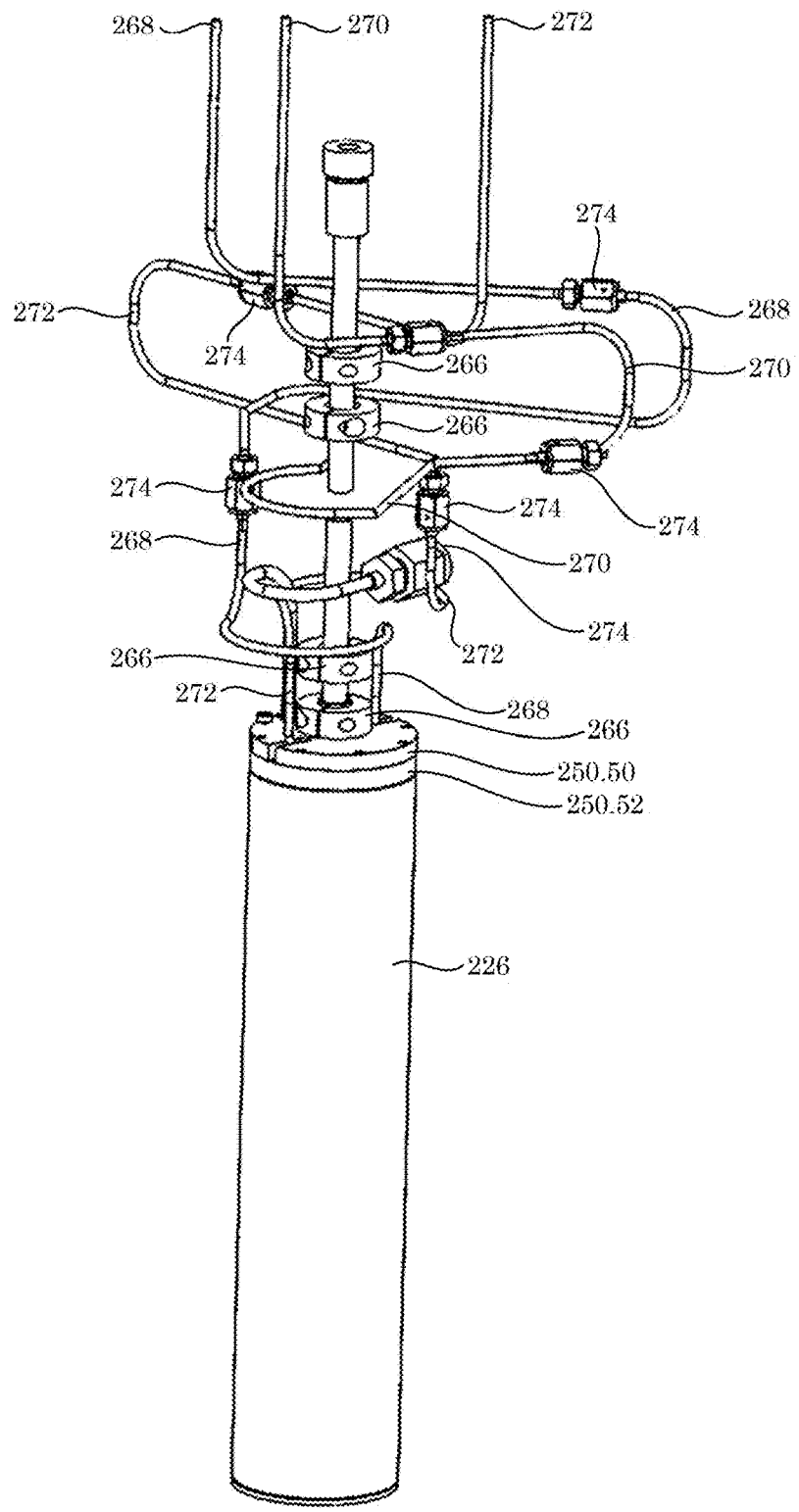
FIG. 19 shows a perspective view of the triple point immersion cell article shown in FIG. 2 with a fourth cryochamber viewable.
Figure 20:
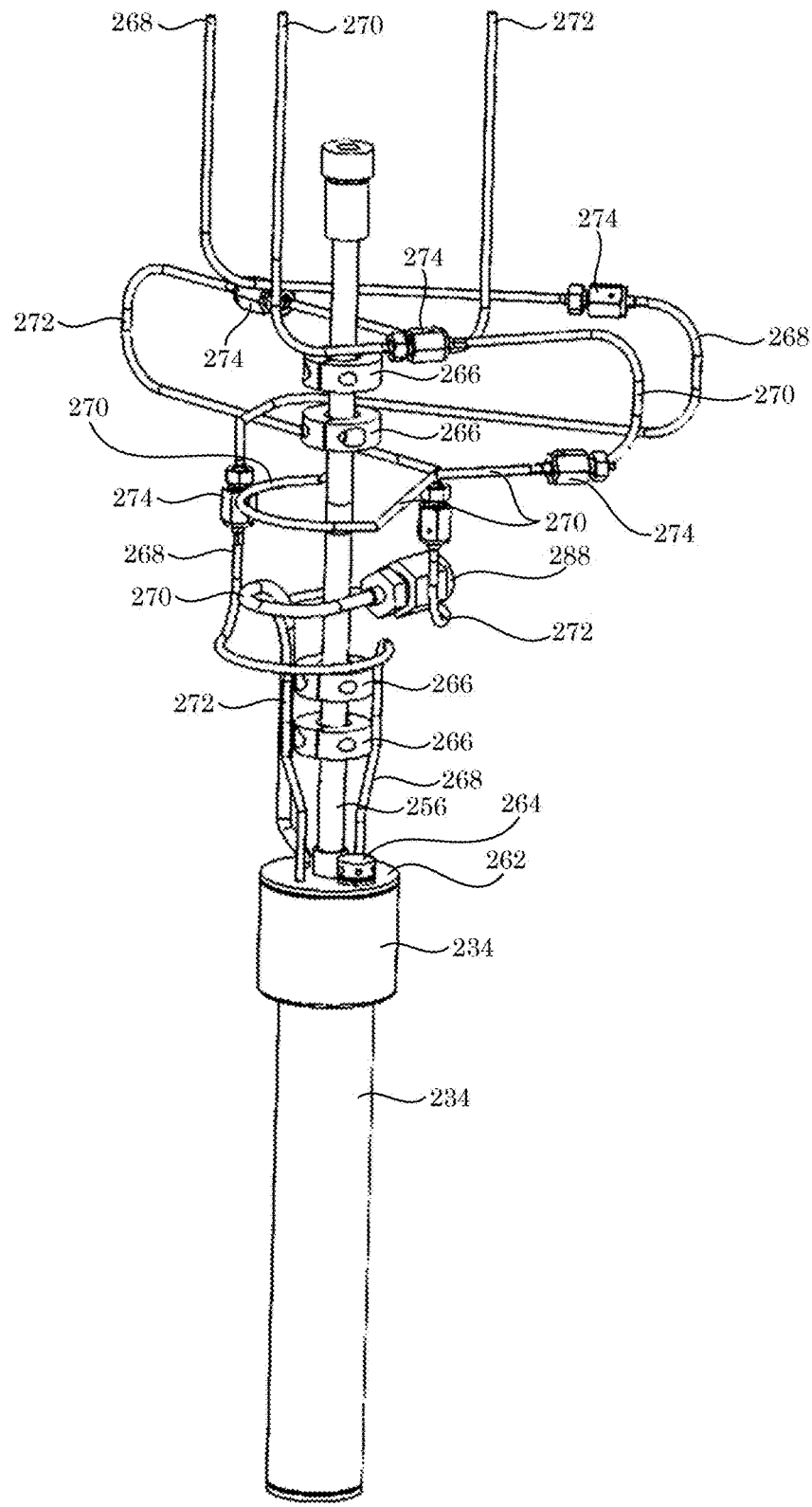
FIG. 20 shows a perspective view of the triple point immersion cell article shown in FIG. 2 with a thermowell viewable.
Figure 21:
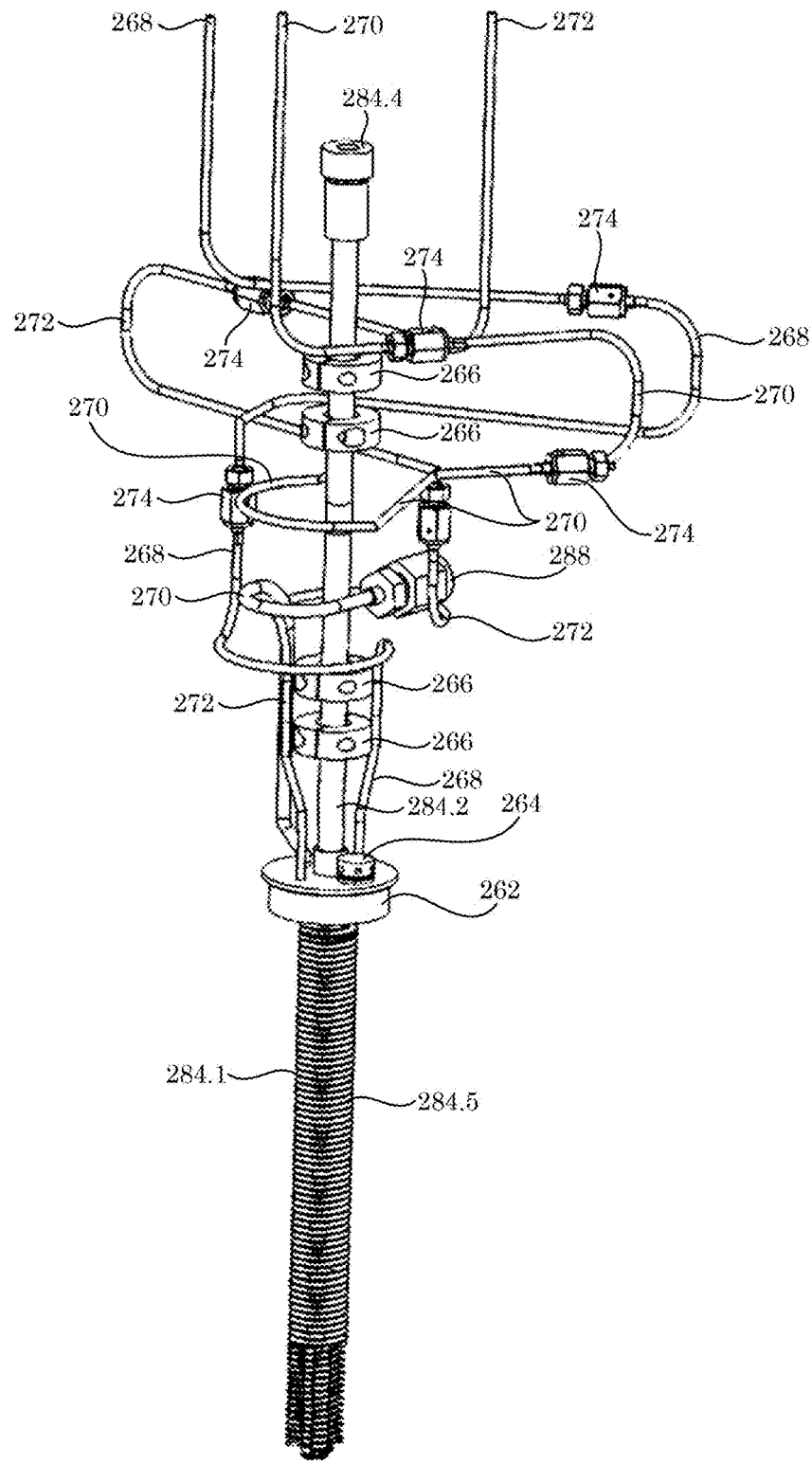
FIG. 21 shows a perspective view of the triple point immersion cell article shown in FIG. 2 with a fin tube viewable.
Figure 22:
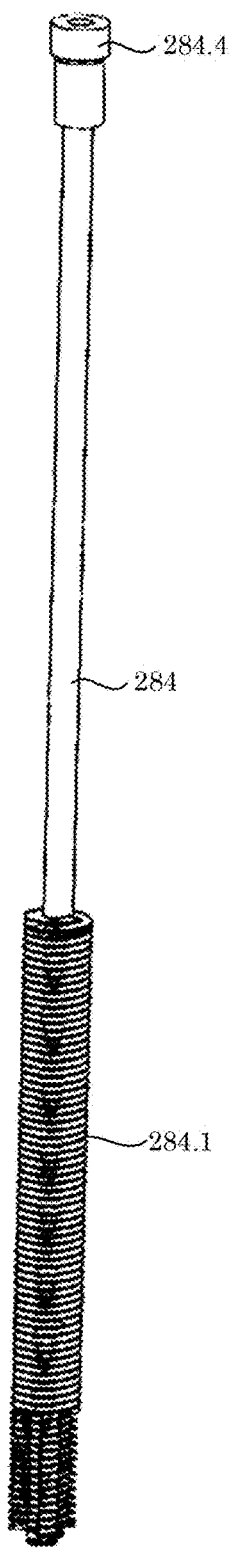
FIG. 22 shows a perspective view of the triple point immersion cell article shown in FIG. 2 with a fin tube viewable.
Figure 23:
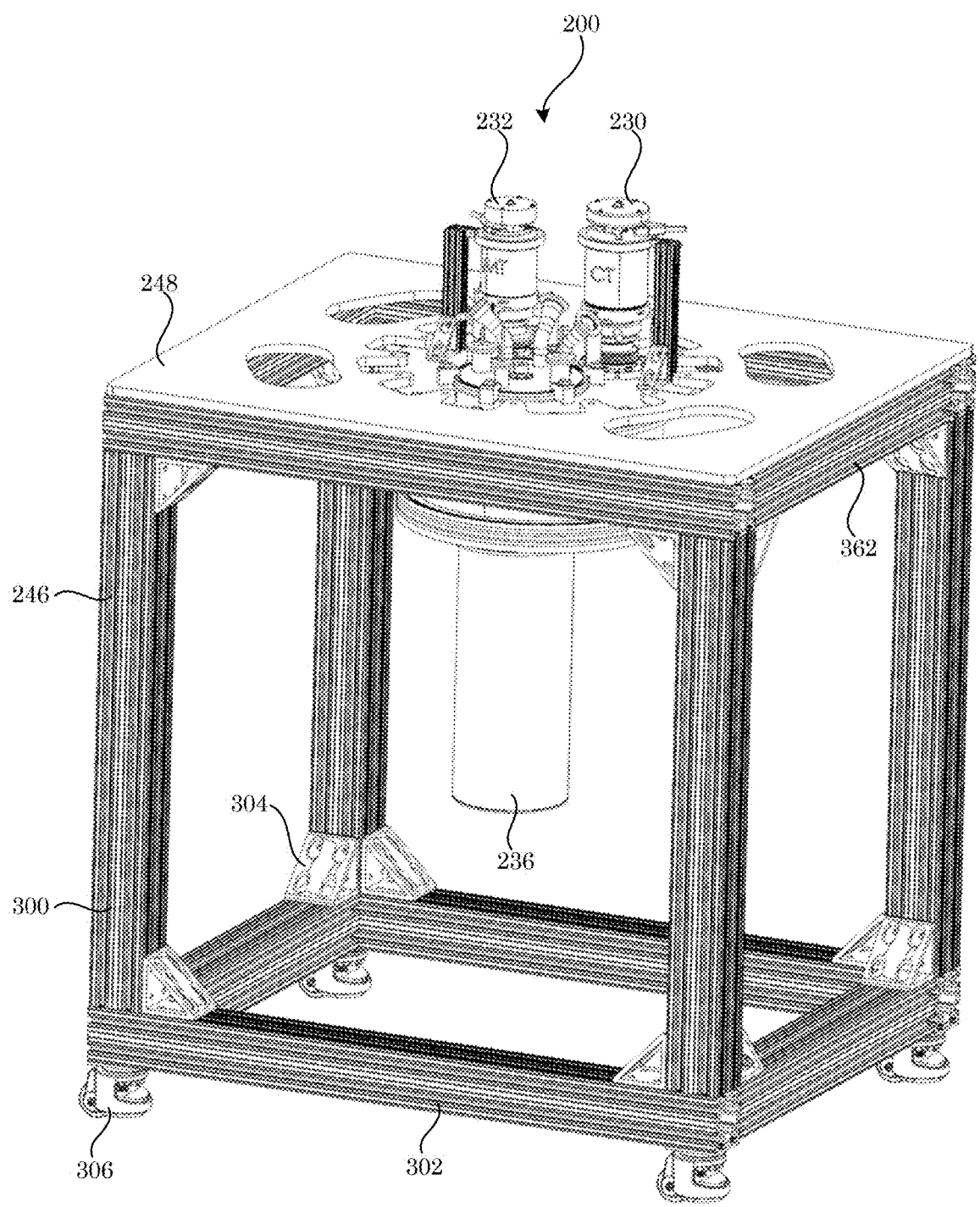
FIG. 23 shows the triple point immersion cell article shown in FIG. 2 disposed on a cart.

With reference to FIG. 11, removal of primary base flange 250.2 and vacuum chamber housing primary section 236.2 exposes first cryochamber top plate 250.8, first cryochamber inner plate 250.12, fixed upper support bushing 278.1, gas line coupler 274, and clamp collar 266. First cryochamber top plate 250.8 is the uppermost section of first cryochamber 212 and is disposed on first cryochamber shield top ring flange 250.9 of first cryochamber 212.2. First cryochamber inner plate 250.12 is a mechanically-decoupled segment of the first cryochamber 212. Upper support bushing 278.1 can include combinations of fiberglass and threaded stainless steel fasteners. A total of three support bushings 278.1 are in tension and support the combined weight of all interior elements. Gas line coupler 274 all-metal gasketed fittings. Exemplary gas line couplers 274 include VCR-type fittings. Moreover, these fittings must be vacuum tight against helium or other gas leaks at the nominal detection limit of $10^{-9}$ std. $cm^3/s$ leak rates when thermally cycled through ranges of 80 K to 300 K. Clamp collar 266 split collar types of stainless-steel supplying radial clamping forces and that remain in compression over multiple thermal cycles between 80 K and 300 K. Clamp collar 266 provides sufficient interfacial forces to provide adequate thermal contact between the thermowell guide tube 284.2 and other cryochamber components.

Figure 2:
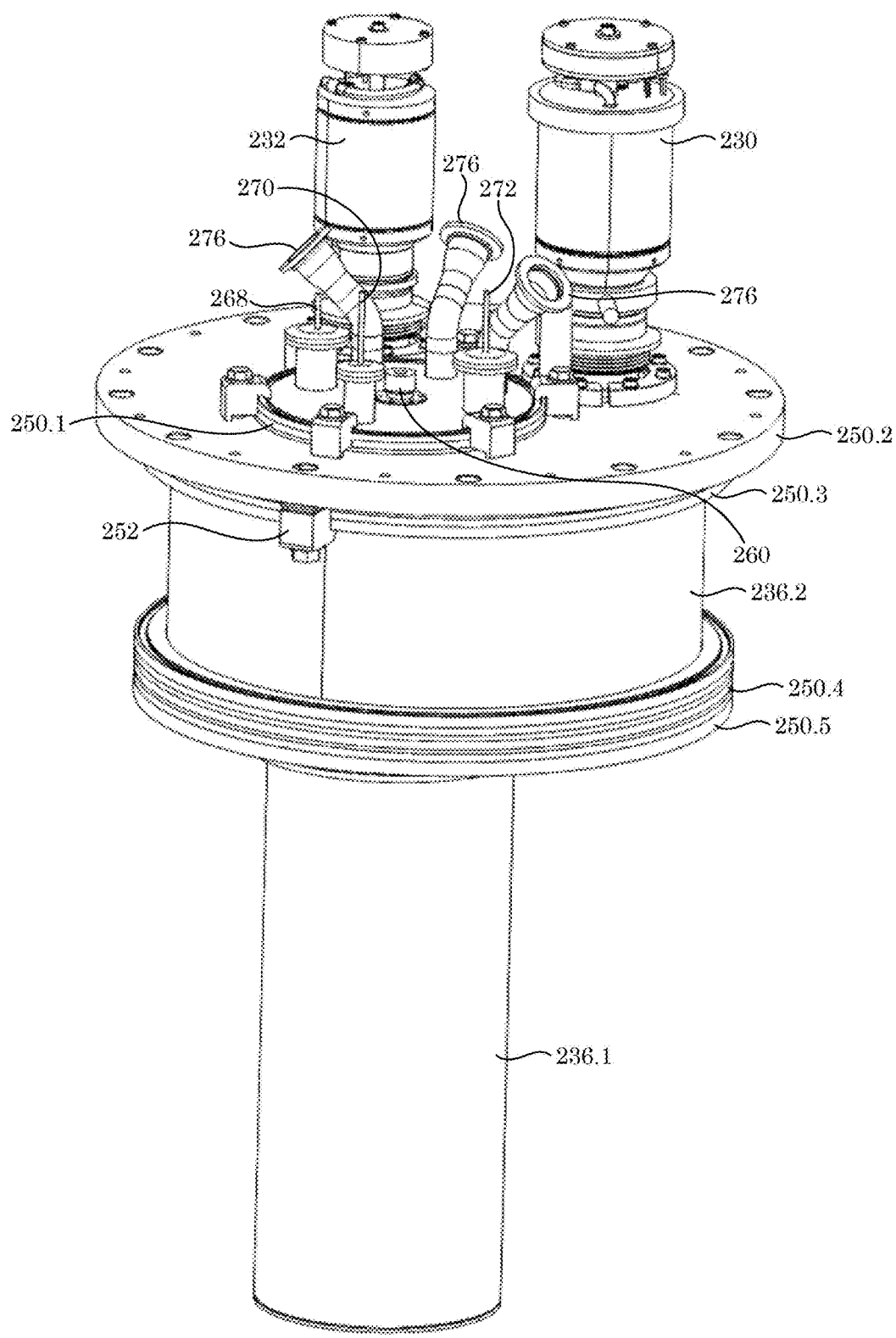
FIG. 2 shows a perspective view of a triple point immersion cell article.
Figure 3:
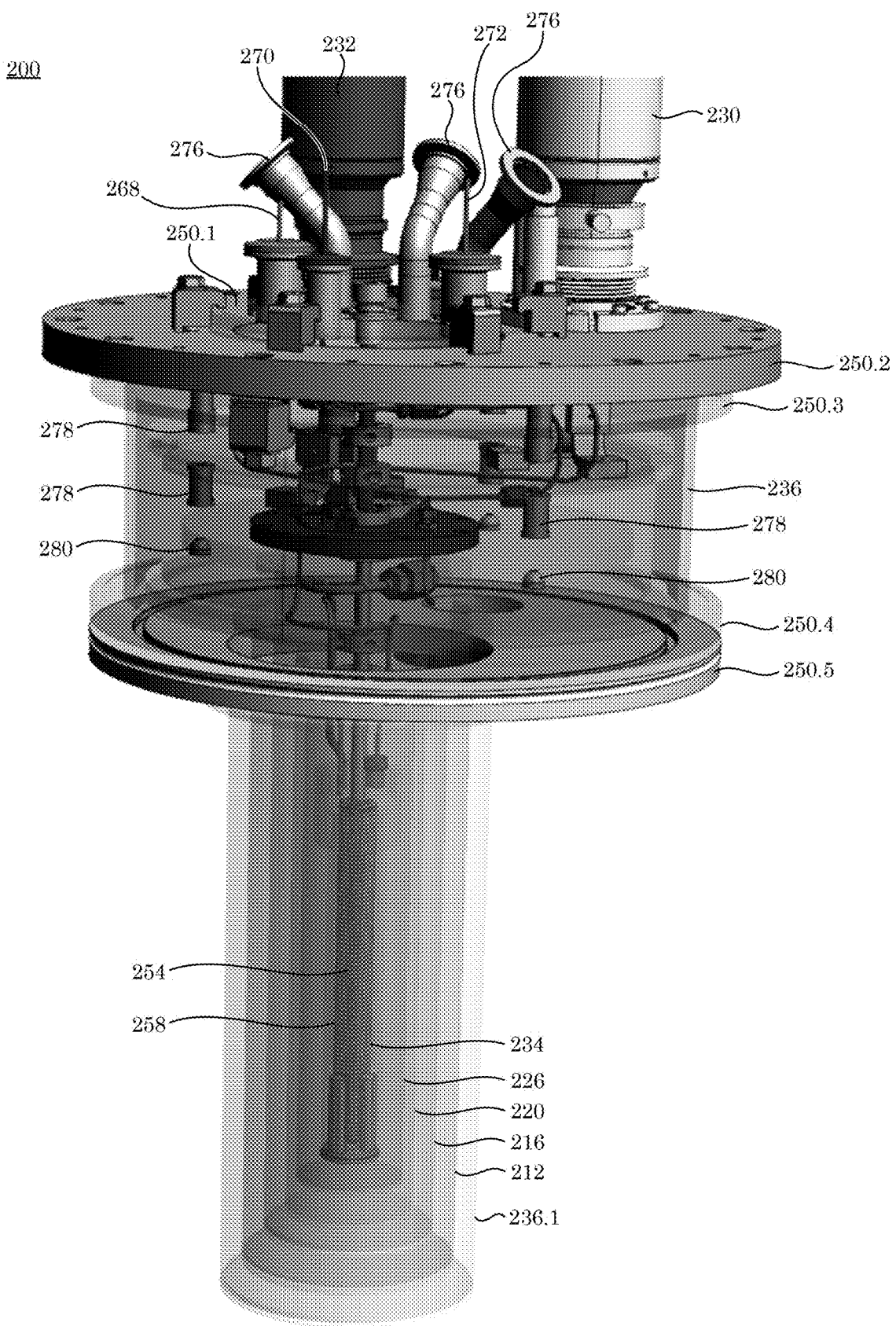
FIG. 3 shows a perspective view of the triple point immersion cell article shown in FIG. 2 with certain portions having high transparency.
Figure 4:
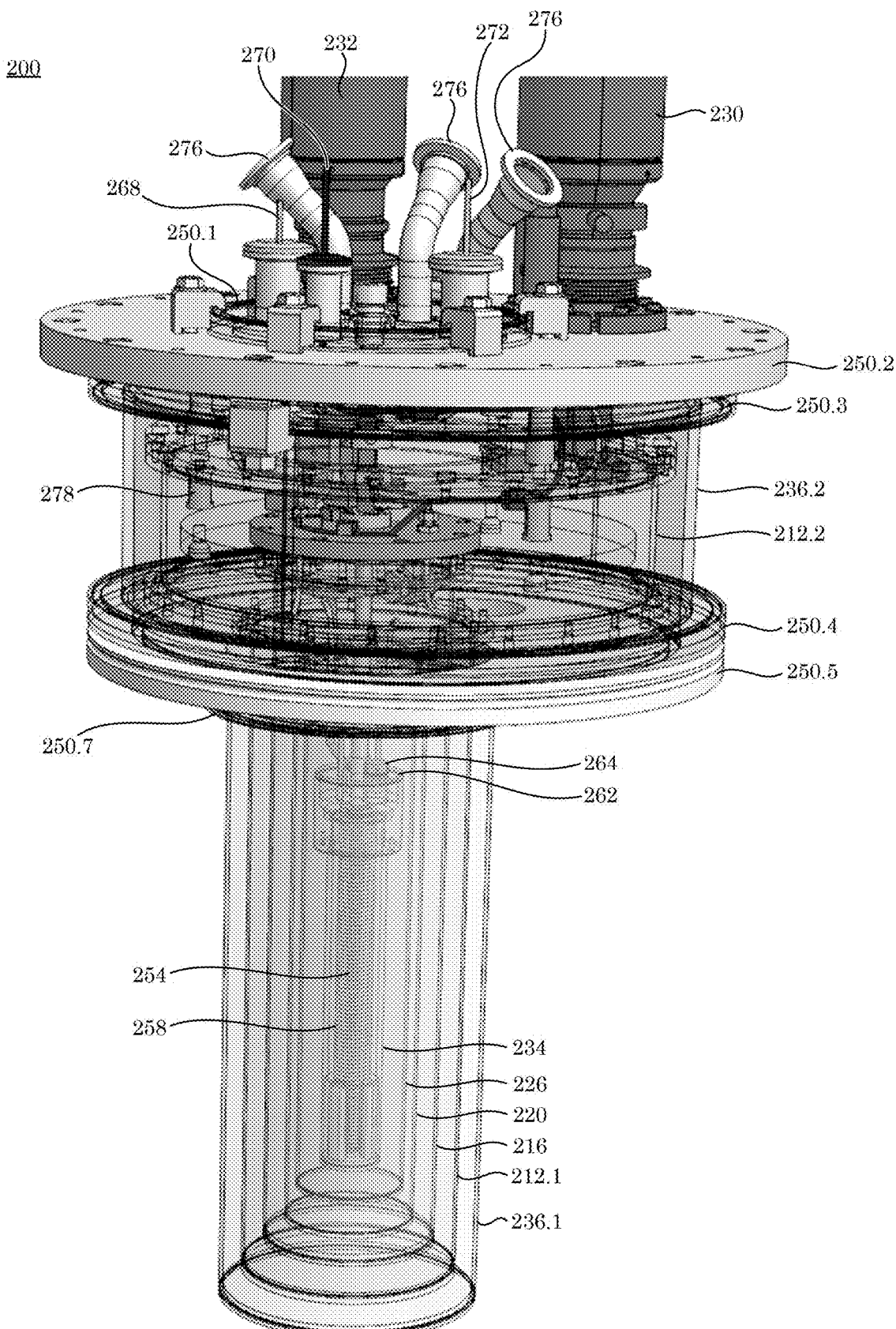
FIG. 4 shows a perspective view of the triple point immersion cell article shown in FIG. 2 with certain portions being shaded.
Figure 5:
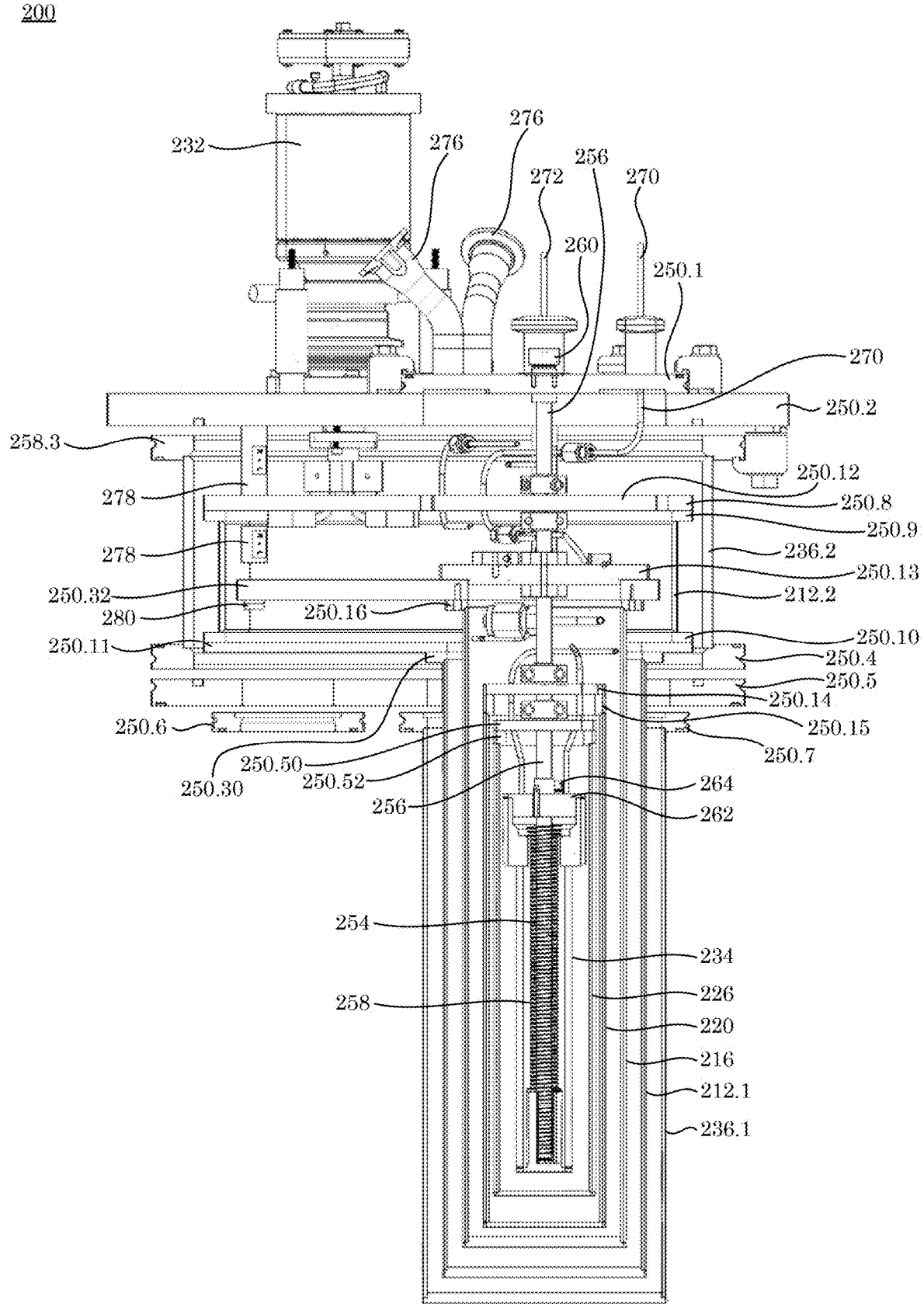
FIG. 5 shows a cross-section of the triple point immersion cell article shown in FIG. 2.
Figure 6:
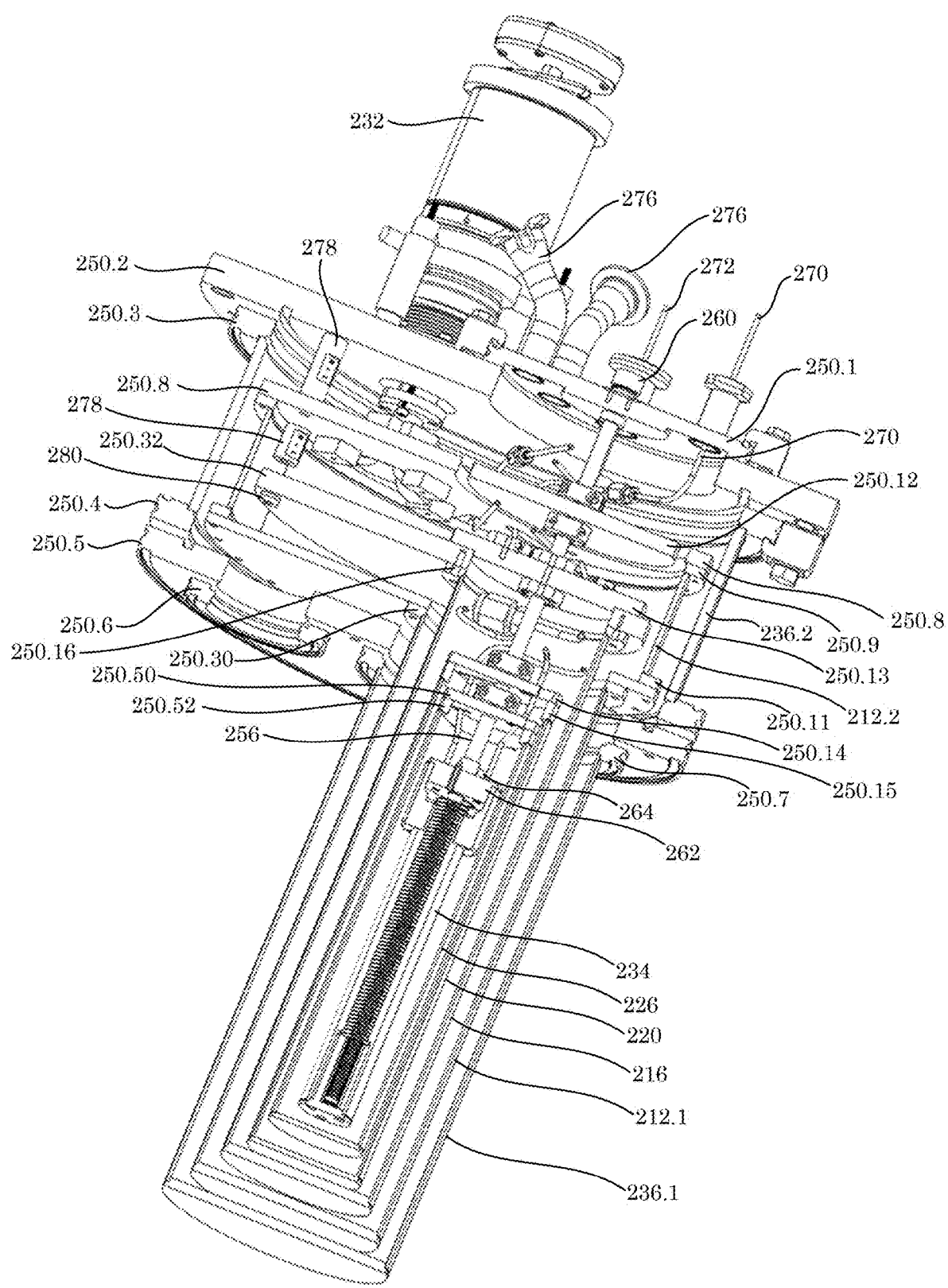
FIG. 6 shows a cross-section in a perspective view of the triple point immersion cell article shown in FIG. 2.
Figure 7:
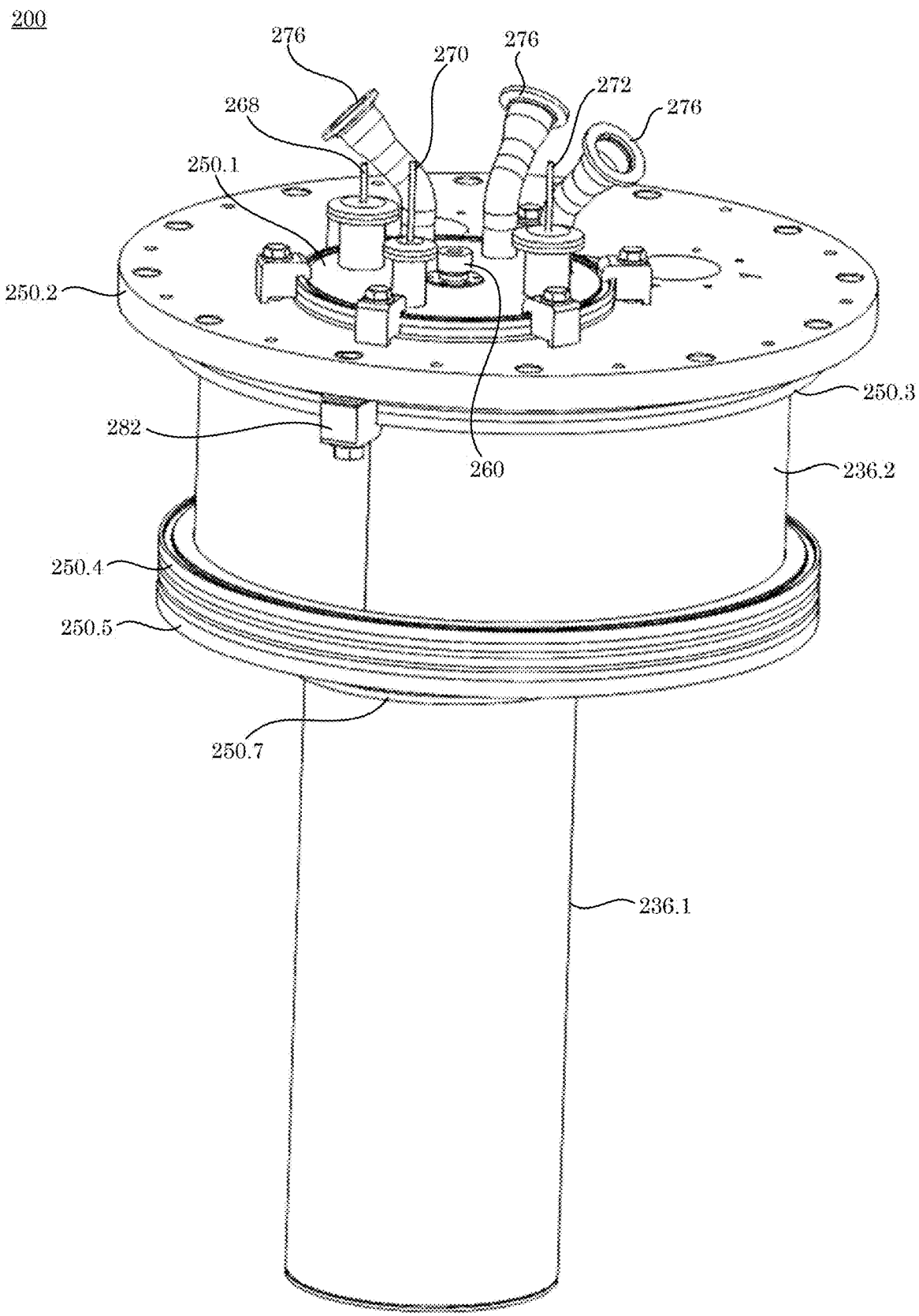
FIG. 7 shows a perspective view of the triple point immersion cell article shown in FIG. 2.
Figure 8:
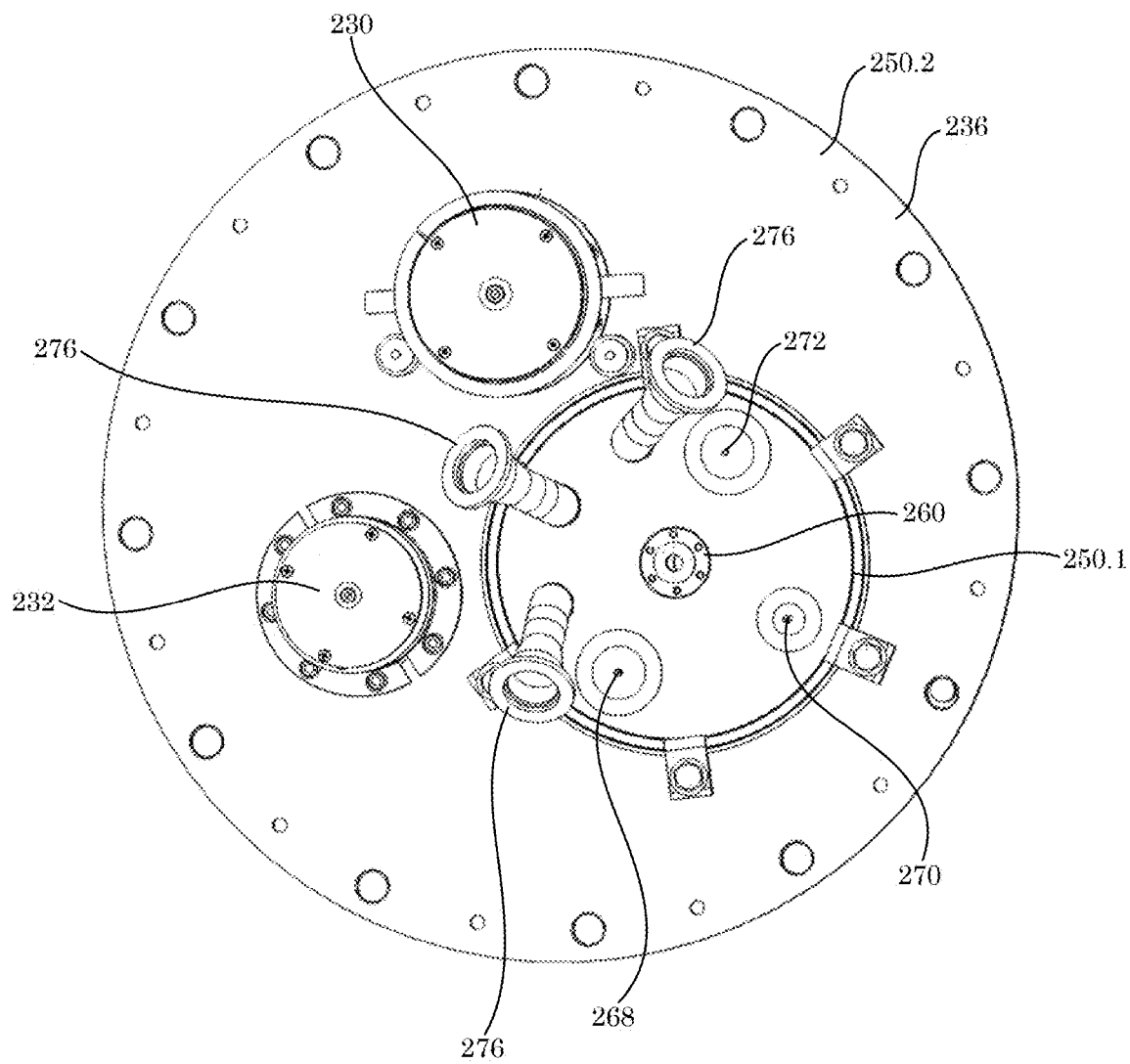
FIG. 8 shows a top view of the triple point immersion cell article shown in FIG. 2.
Figure 9:
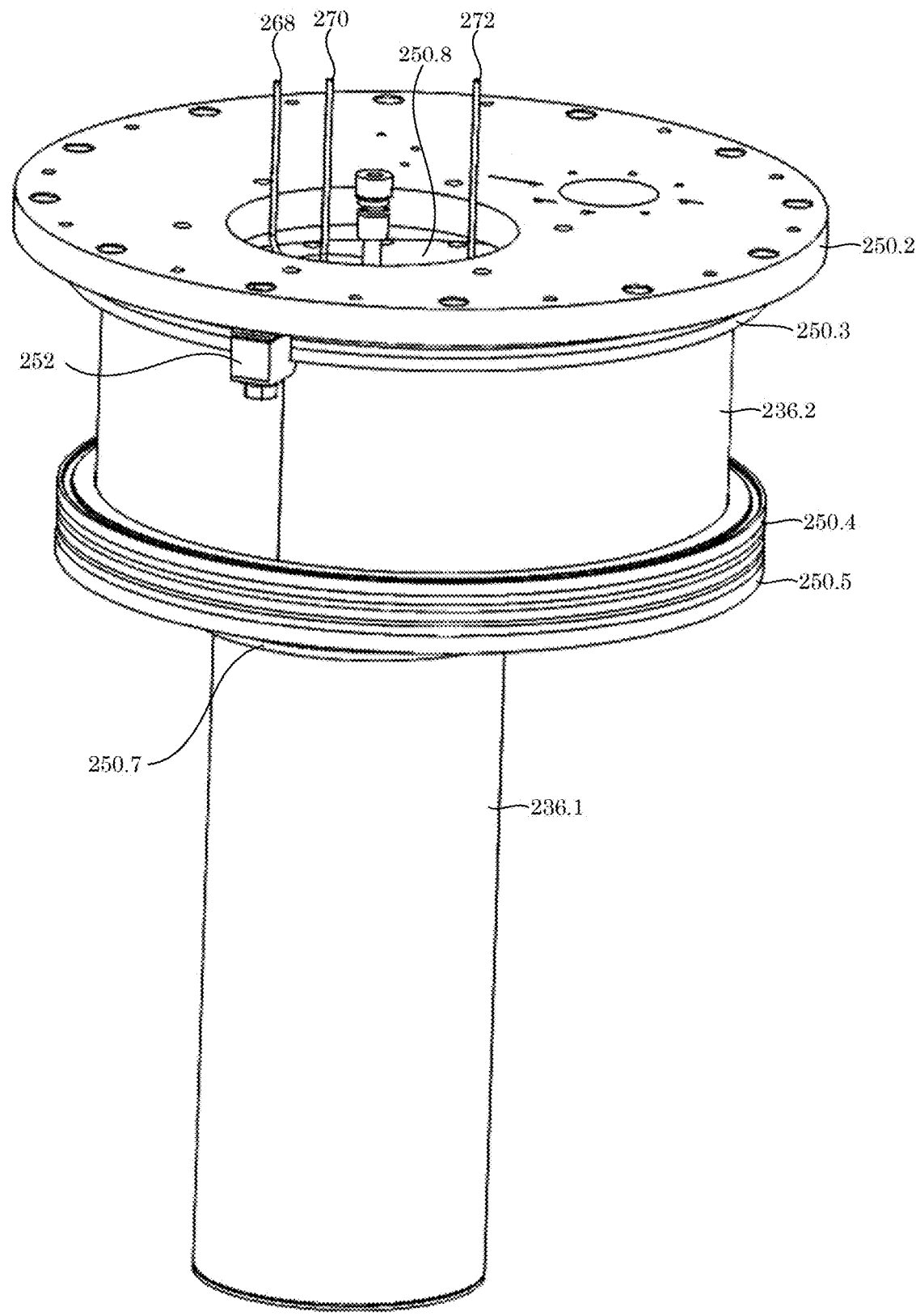
FIG. 9 shows a perspective view of the triple point immersion cell article shown in FIG. 2 without cryocoolers.
Figure 10:
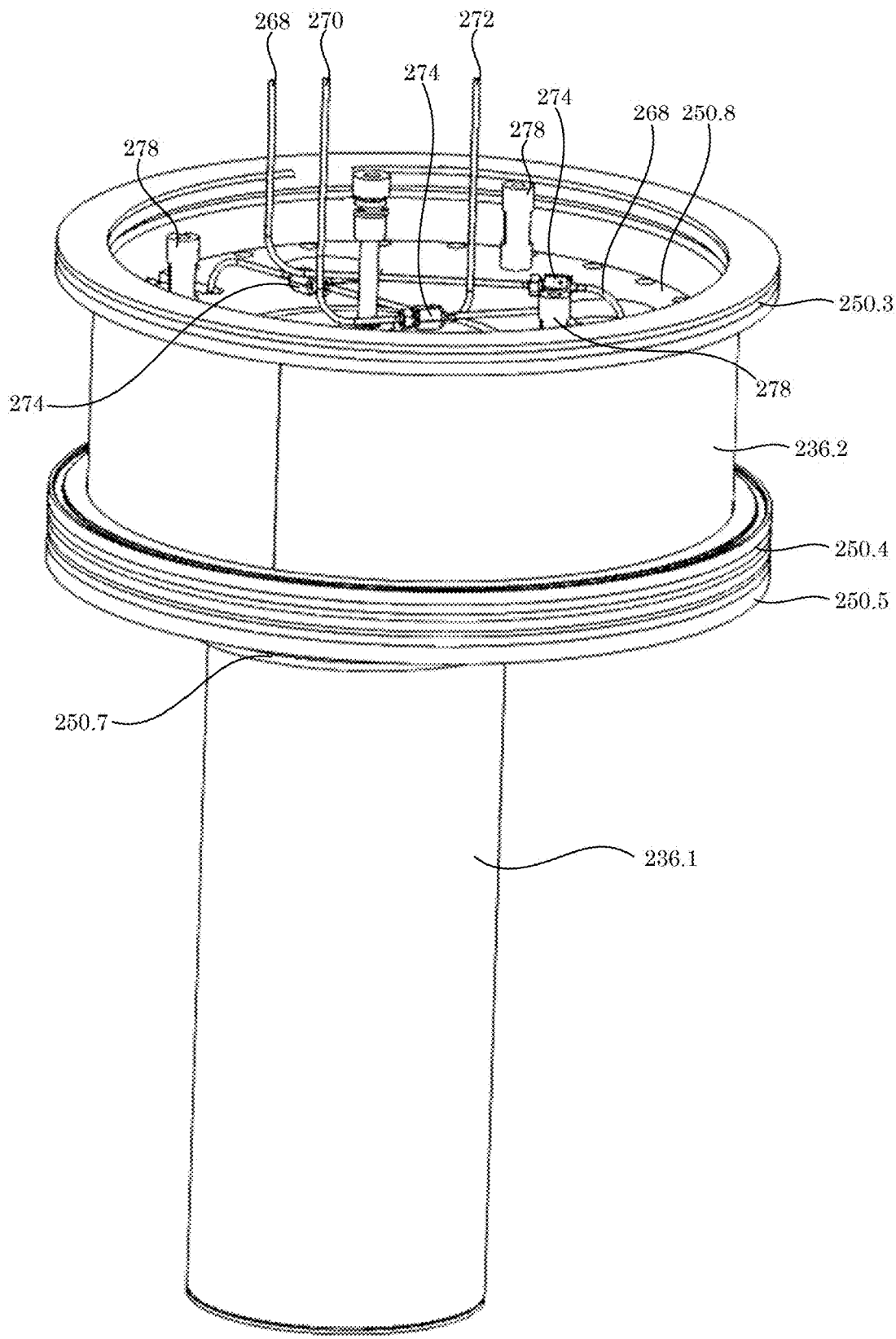
FIG. 10 shows a perspective view of the triple point immersion cell article shown in FIG. 2 with vacuum chamber housing viewable.

In an embodiment, with reference to FIG. 2, triple point immersion cell article 200 is disposed on mount plate 248 of cart 246. Cart 246 can include side rails 300, transverse rails 302, brackets 304, and casters 306 to stabilize and provide mobility to triple point immersion cell article 200.

Triple-point cell internal volume 282 is also accessible via internal service port 288. Service port 288 allows internal volume 282 to be flushed and purged with a source of pure gas analyte 210 prior to final assembly of the article 200 or during service intervals. Service port 288 is capped-off with a metal-gasketed fitting when not in use. The flow impedance of the short section of gas line connecting the internal volume 282 with the service port 288 is approximately 25 times smaller than that of the first 268 and third 272 gas lines in the viscous flow regime and 11 times smaller in the molecular flow regime. Service port 288 allows evacuation of the triple-point cell internal volume to lower ultimate pressures than are possible using the first 268 and third 272 gas lines alone.

Triple point immersion cell article 200 can be made in various ways. In an embodiment, a process for making triple point immersion cell article 200 includes forming copper heat-exchange fins 284.5 on thermowell fin tube 284.1 by furnace brazing processes; forming thermowell feed cap 260 on thermowell guide tube 284.2 by tungsten-inert-gas (TIG) welding; disposing thermowell fin tube 284.1 on vapor chamber lid 262 by TIG welding; disposing burst disc 264 on vapor chamber lid 262 by TIG welding; disposing first gas line 268, second gas line 270, and third gas line 272 on vapor chamber lid 262 by TIG welding; disposing clamp collar 266 on thermowell extension tube 284.3 by fasteners; extending a length of first gas line 268, second gas line 270, and third gas line 272 by gasket sealed VCR-type gas line coupler 274; disposing vapor chamber lid 262 on thermowell guide tube 284.2 by TIG welding; disposing thermowell guide tube 284.2 onto fourth cryochamber upper plate 250.50 by fasteners using clamp collar 266; disposing fourth cryochamber upper plate 250.50 on fourth cryochamber ring flange 250.52 by M3 fasteners; disposing fourth cryochamber ring flange 250.52 on fourth cryochamber 226 by soldering; disposing thermowell guide tube 284.2 onto third cryochamber upper plate 250.14 by fasteners using clamp collar 266; disposing third cryochamber upper plate 250.14 onto third cryochamber ring flange 250.15 by M3 fasteners; disposing second cryochamber heat exchange flange 250.13 on second cryochamber base plate 250.32 by fasteners; disposing second cryochamber base plate 250.32 on second cryochamber ring flange 250.16 by TIG welding; disposing thermowell guide tube 284.2 onto second cryochamber heat exchange flange 250.13 by fasteners and crushed indium wire; connecting second cryochamber base plate 250.32 to first cryochamber shield top ring flange 250.9 by M3 fasteners; disposing first cryochamber bottom plate 250.11 on first cryochamber tail-section ring flange 250.30 by fasteners; disposing first cryochamber shield bottom ring flange 250.10 on first cryochamber bottom plate 250.11 by fasteners; disposing first cryochamber top plate 250.8 on first cryochamber shield top ring flange 250.9 by fasteners; disposing first cryochamber inner plate 250.12 on first cryochamber top plate 250.8 by fasteners and copper wire thermal straps; disposing thermowell extension tube 284.3 onto first cryochamber inner plate 250.12 by fasteners and crushed indium wire; connecting first cryochamber top plate 250.8 to primary base flange 250.2 by fasteners and fiberglass fixed upper support bushings 278.1; disposing lower base flange 250.5 on tail section flange 250.7 by ISO clamps and fasteners; disposing nipple lower flange 250.4 on lower base flange 250.5 by ISO clamps and fasteners; disposing primary base flange 250.2 on nipple upper flange 250.3 by ISO clamps and fasteners; disposing service flange 250.1 on primary base flange 250.2 by ISO half-clamps and fasteners; disposing thermowell extension tube 284.3 in the thermowell-thermometer seal fitting via TIG welding; disposing the thermowell-thermometer seal fitting into the O-ring sealed threaded coupling 260 by fasteners; disposing the O-ring-sealed threaded coupling onto the service flange 250.1 by fasteners; connecting first gas line 268, second gas line 270, and third gas line 272 to service flange 250.1 by TIG welded ISO flanges and clamps; disposing second cryocooler 232 and first cryocooler 230 on primary base flange 250.2 by bellows-coupled ISO flanges and fasteners; connecting first cryocooler 230 to first cryochamber 212 by copper-wire thermal straps and fasteners; and connecting second cryocooler 232 to second cryochamber 216 by copper-wire thermal straps and fasteners.

Figure 25:
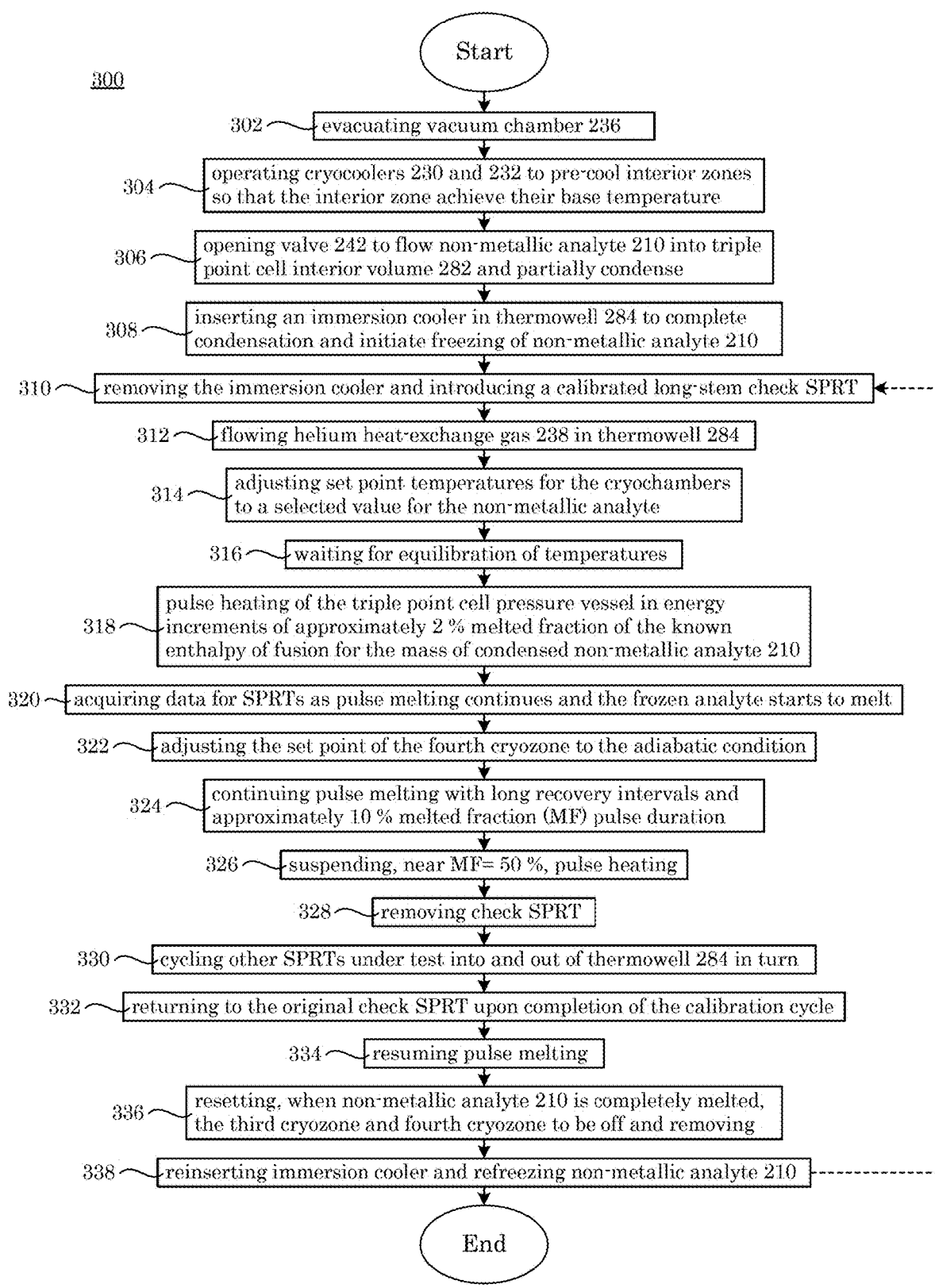
FIG. 25 shows a flow chart for determining a triple point temperature.

Triple point immersion cell article 200 has numerous advantageous and unexpected benefits and uses. In an embodiment, with reference to FIG. 25, a process (300) for determining the triple point of non-metallic analyte 210 with triple point immersion cell article 200 includes: evacuating vacuum chamber 236 (step 302); operating cryocoolers 230 and 232 to pre-cool interior zones so that the interior zone achieve their base temperature (step 304); opening valve 242 to flow non-metallic analyte 210 into triple point cell interior volume 282 and partially condense (step 306); inserting an immersion cooler in thermowell 284 to complete condensation and initiate freezing of non-metallic analyte 210 (step 308); removing the immersion cooler and introducing a calibrated long-stem check SPRT (step 310); flowing helium heat-exchange gas 238 in thermowell 284 (step 312); adjusting set point temperatures for the cryochambers to a selected value for the non-metallic analyte (step 314); waiting for equilibration of temperatures (step 316); pulse heating of the triple point cell pressure vessel in energy increments of approximately 2% melted fraction of the known enthalpy of fusion for the mass of condensed non-metallic analyte 210 (step 318); acquiring data for SPRTs as pulse melting continues and the frozen analyte starts to melt (step 320); adjusting the set point of the fourth cryo-zone to the adiabatic condition (step 322); continuing pulse melting with long recovery intervals and approximately 10% melted fraction (MF) pulse duration (step 324); suspending, near MF=50%, pulse heating (step 326); removing check SPRT (step 328); cycling other SPRTs under test into and out of thermowell 284 in turn (step 330); returning to the original check SPRT upon completion of the calibration cycle (step 332); resuming pulse melting (step 334); resetting, when non-metallic analyte 210 is completely melted, the third cryo-zone and fourth cryo-zone to be off and removing SPRT (step 336); reinserting immersion cooler and refreezing non-metallic analyte 210 (step 338); and optionally repeating the process starting with the repetition entry step 310.

Triple point immersion cell article 200 and processes disclosed herein have numerous beneficial uses, including calibration of SPRTs, realization of an in-house temperature scale, verification of other fixed-point cells, and provision of national metrology institute (NMI) traceable article for laboratory accreditation. Triple point immersion cell article 200 and processes herein advantageously provide ready adaptability to different non-metal fixed points using different non-metal analytes having triple points from 80 K to 200 K. Beneficially, triple point immersion cell article 200 overcomes limitations of technical deficiencies of conventional articles such as those employing liquid-nitrogen pool boiling (LNPB). The LNPB process limits the possible applications to non-metal analytes having triple points near to or just above the range of temperatures achievable via saturated vapor pressures of liquid nitrogen. Further, the open cycle nature of the LNPB process necessitates interruptions and thermal perturbations associated with refilling reservoirs to compensate volume evaporation.

Moreover, triple point immersion cell article 200 and processes herein has a design advantage over the conventional LNPB process. In an aspect, the geometric design constraints associated with maximizing the size of a liquid nitrogen reservoir are eliminated. This allows for greater freedom in the design of the thermowell 284 and the aspect ratio of triple point cell internal volume 282 such that the achievable immersion depth of the cell is maximized.

Triple point immersion cell article 200 provides a compact and standardized thermal platform in which triple points of rare gas condensates or other non-metals can be determined for calibration of a thermometer and to realize definitions the ITS-90 and or future ITS. Triple point immersion cell article 200 includes a fixed-point cell that is referred to as an immersion-type cell, where thermowell 284 is directly accessible from the exterior of triple point immersion cell article 200. A four cryo-zone configuration is included in triple point immersion cell article 200, wherein the first two outermost zones can be actively cooled using Stirling-cycle cryocoolers, and the innermost two cryozones provide additional control and isolation. Triple point immersion cell article 200 can accommodate any nonmetal fixed point from 80 K to 200 K and provides conditions for stable and reproducible melt plateaus.

It is contemplated the triple point immersion cell article 200 provides determination of a single non-metal triple point and accommodates immersion-type triple-point cells of argon, krypton, xenon, or non-metal (e.g. $N_2O$, $NH_3$, $CH_3OH$, and the like) fixed point from 80 K to 200 K. Advantageously, triple point immersion cell article 200 includes closed-cycle refrigeration to support immersion-type non-metal triple point cells and overcome technical limitations involved with conventional apparatus that use liquid nitrogen pool boiling, a technology that can be viable only for argon triple-point cells.

triple point immersion cell article 200 receives a long-stem thermometer via a single externally-accessible thermowell 284. In addition, triple point immersion cell article 200 can receive a capsule-type thermometer via three internal thermowells. Triple point immersion cell article 200 also overcomes technical limitations of conventional closed-cycle-based apparatus for non-metal triple-point cells that only accommodate capsule-type thermometers. Miniature triple-point cells are sequestered inside adiabatic calorimeters and are not accessible from the external environment during use, i.e., during operation on a melt plateau. Accordingly, triple point immersion cell article 200 accommodates immersion-type triple point cells that provide direct access to the cell while on the melt plateau. Triple point cell article 200 includes closed cycle refrigeration for immersion-type argon triple point cells or other immersion-type fixed point cells, such as the Kr and Xe triple points, for the calibration of long-stem SPRTs. This combination of immersion type triple-point cells for non-metals other than argon has been unavailable in conventional apparatus due to an unsuitable range of saturated-vapor-pressure equilibrium temperatures associated with pool boiling of liquid nitrogen.

Triple point immersion cell article 200 can include central 50-cm long thermowell 284 that extend from an external port into a non-metal analyte cell and continuously purged with pre-cooled helium gas. Three additional small thermowells for capsule thermometers can be accessible via the vacuum chamber. The triple point cells are designed to be operated in the melting mode. During melting of the non-metal solid, the inner-most zone is set to approximate adiabatic conditions and reduces or eliminates perturbative heat leaks that could otherwise affect the reproducibility of the melt plateau. An integral gas manifold and storage volume permits gas to remain at pressures below 300 psig when triple point immersion cell article 200 is at 300 K.

Triple point immersion cell article overcomes maintenance and performance limitations of liquid-nitrogen cooled systems for argon TP cells and operates in an absence of liquid nitrogen. With respect to conventional apparatus, triple point immersion cell article 200 provides thermal stability, reproducibility, and duration of melt plateaus that are greatly improved since the thermal transients and variable gradients associated with a liquid pool are eliminated. Settings of controlled cryo-zones are unconstrained by vapor-liquid equilibrium of nitrogen so that triple point immersion cell article 200 provides optimized zone-temperature settings. Triple point immersion cell article has an effective immersion depth of the fixed-point cell that is unconstrained by having an adequate volume of liquid nitrogen in a reservoir above the cell.

Triple point immersion cell article 200 is modular and standardized with demountable vacuum flanges and other demountable fittings, wherein triple point immersion cell article 200 can be disassembled or reassembled in the field, enabling efficient servicing, maintenance, and low-risk shipping. It should be appreciated that conventional apparatus with be pool-boiling can be bulky, not field-serviceable, and difficult to ship without incurring leaks or other damage.

Triple point immersion cell article 200 and processes herein unexpectedly provides combinations of fixed points to be introduced and deployed for use in laboratories using long-stem thermometers. Moreover, triple point immersion cell article 200 can be used with any fixed-point cell having a transition temperature from 80 K to 200 K.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A triple point immersion cell article for determining a triple point of a non-metallic analyte, the triple point immersion cell article comprising:
   a first cryochamber comprising a first cryo-zone;
   a second cryochamber comprising a second cryo-zone, the second cryochamber being:
      nested and disposed in the first cryochamber; and
      thermally isolated from an exterior environment of the triple point immersion cell article by the first cryochamber;
   a third cryochamber comprising a third cryo-zone, the third cryochamber being:
      nested and disposed in the second cryochamber;
      thermally isolated from the exterior environment by the first cryochamber and the second cryochamber; and
      thermally isolated from the first cryochamber by the second cryochamber; and
   a fourth cryochamber comprising a fourth cryo-zone, the fourth cryochamber being:
      nested and disposed in the third cryochamber;
      thermally isolated from the exterior environment by the first cryochamber, the second cryochamber, and the third cryochamber; and
      thermally isolated from the second cryochamber by the third cryochamber; and
   a triple-point pressure vessel comprising a fifth cryo-zone, the triple-point pressure vessel being:
      nested and disposed in the fourth cryochamber;
      thermally isolated from the exterior environment by the first cryochamber, the second cryochamber, the third cryochamber, and the fourth cryochamber; and
      thermally isolated from the third cryochamber by the fourth cryochamber; and
   a thermowell disposed in the triple-point pressure vessel, the triple-point pressure vessel being directly accessible from the exterior environment via thermowell.

2. The triple point immersion cell article of claim 1, further comprising a first cryocooler in thermal communication with the first cryochamber.

3. The triple point immersion cell article of claim 2, wherein the first cryocooler actively cools the first cryochamber to produce the first cryo-zone.

4. The triple point immersion cell article of claim 2, wherein the first cryocooler comprises a Stirling cycle cryocooler.

5. The triple point immersion cell article of claim 1, further comprising a second cryocooler in thermal communication with the second cryochamber.

6. The triple point immersion cell article of claim 5, wherein the second cryocooler actively cools the second cryochamber to produce the second cryo-zone.

7. The triple point immersion cell article of claim 5, wherein the second cryocooler comprises a Stirling cycle cryocooler.

8. The triple point immersion cell article of claim 1, wherein the first cryo-zone and the second cryo-zone are subjected to closed-cycle refrigeration in an absence of a liquid cryogen.

9. The triple point immersion cell article of claim 1, wherein the fourth cryo-zone is an adiabatic zone with respect to a triple point transition temperature of non-metallic analyte.

10. The triple point immersion cell article of claim 1, wherein the first cryochamber, the second cryochamber, the third cryochamber, and the fourth cryochamber are reversibly demountable and re-mountable from one another.

11. The triple point immersion cell article of claim 1, wherein the triple-point pressure vessel accommodates a fixed point of the non-metallic analyte from 75 K to 175 K.

12. The triple point immersion cell article of claim 1, wherein the fourth cryo-zone provides a stable and reproducible melt plateau for the non-metallic analyte.

13. The triple point immersion cell article of claim 1, wherein the non-metallic analyte comprises a rare gas condensate.

14. The triple point immersion cell article of claim 1, wherein the triple-point pressure vessel and triple-point cell interior volume receive a long-stem thermometer or capsule-type thermometer for calibration at the triple point of the non-metallic analyte.

15. The triple point immersion cell article of claim 1, wherein a pressure of the first cryochamber, the second cryochamber, the third cryochamber, and the fourth cryochamber is high-vacuum.

16. The triple point immersion cell article of claim 1, wherein the first cryo-zone, the second cryo-zone, the third cryo-zone, and the fourth cryo-zone are subjected to active control.

17. The triple point immersion cell article of claim 1, further comprising a thermowell with a length that is from 10 cm to 100 cm to receive a long-stem thermometer, wherein the thermowell is in thermal communication with the first cryo-zone, the second cryo-zone, the third cryo-zone, and the fourth cryo-zone and in mechanical communication with the first cryochamber, the second cryochamber, the third cryochamber, the fourth cryochamber, the triple-point pressure vessel, the triple-point cell interior volume, and the thermowell receiving helium as a heat exchange gas at a pressure from 1 millibar (mbar) to 1.3 bar.

18. The triple point immersion cell article of claim 1, further comprising a vacuum chamber housing disposed around the first cryochamber.

19. A process for determining a triple point of a non-metallic analyte with the triple point immersion cell article of claim 1, the process comprising:
   evacuating a vacuum chamber in which the first cryochamber is disposed;
   cooling the first cryo-zone, the second cryo-zone, the third cryo-zone, and the fourth cryo-zone with a cryocooler;
   flowing the non-metallic analyte into the triple point cell interior volume to partially condense the non-metallic analyte;
   inserting an immersion cooler in the thermowell to complete condensation of the non-metallic analyte;
   initiating freezing of the non-metallic analyte;
   removing the immersion cooler;
   introducing a calibrated standard platinum resistance thermometer into the thermowell;
   flowing helium heat-exchange gas in the thermowell;

adjusting a set point temperature of each of the first cryochamber, the second cryochamber, the third cryochamber, and the fourth cryochamber to a selected value for the non-metallic analyte;
pulse heating of the triple point cell pressure vessel in energy increments;
adjusting a set point of the fourth cryo-zone to an adiabatic condition;
suspending pulse heating;
removing the calibrated standard platinum resistance thermometer;
disposing a test standard platinum resistance thermometer into thermowell;
removing the test standard platinum resistance thermometer from the thermowell;
re-disposing the calibrated standard platinum resistance thermometer in the thermowell;
resuming pulse melting;
completely melting the non-metallic analyte;
reinserting the immersion cooler into the thermowell; and
refreezing the non-metallic analyte to determine the triple point of the non-metallic analyte.

* * * * *